United States Patent
Brady et al.

(10) Patent No.: US 11,584,179 B2
(45) Date of Patent: Feb. 21, 2023

(54) REAR SUSPENSION ASSEMBLY FOR A VEHICLE

(71) Applicant: Polaris Industries Inc., Medina, MN (US)

(72) Inventors: Louis J. Brady, Chisago City, MN (US); John M. Nutter, Stacy, MN (US); Timothy J. Giese, White Bear Lake, MN (US); Donald S. Hansen, Big Lake, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/215,882

(22) Filed: Mar. 29, 2021

(65) Prior Publication Data

US 2021/0213794 A1 Jul. 15, 2021

Related U.S. Application Data

(62) Division of application No. 16/226,797, filed on Dec. 20, 2018, now Pat. No. 10,967,694.

(Continued)

(51) Int. Cl.
  *B60G 3/20* (2006.01)
  *B60G 21/055* (2006.01)
  *B60G 7/00* (2006.01)

(52) U.S. Cl.
  CPC ............ *B60G 3/202* (2013.01); *B60G 7/008* (2013.01); *B60G 21/055* (2013.01);
  (Continued)

(58) Field of Classification Search
  CPC ...... B60G 3/202; B60G 7/008; B60G 21/055; B60G 2200/1422; B60G 2200/182;
  (Continued)

(56) References Cited

U.S. PATENT DOCUMENTS

| 308 | A | 7/1837 | Winans |
| 2,502,061 | A | 3/1950 | Radford |

(Continued)

FOREIGN PATENT DOCUMENTS

| CN | 101646582 A | 2/2010 |
| CN | 203806046 U | 9/2014 |

(Continued)

OTHER PUBLICATIONS

Office Action issued by the Canadian Intellectual Property Office, dated Jul. 30, 2021, for Canadian Patent Application No. 3,088,883; 3 pages.

(Continued)

*Primary Examiner* — Paul N Dickson
*Assistant Examiner* — Kurtis Nielson
(74) *Attorney, Agent, or Firm* — Faegre Drinker Biddle & Reath LLP

(57) ABSTRACT

A utility vehicle includes a rear suspension assembly which has a trailing arm generally extending longitudinally. Also, the rear suspension assembly includes an upper radius rod extending in a generally lateral direction relative to a centerline of the vehicle. Additionally, the rear suspension assembly includes a lower radius rod extending in a generally lateral direction relative to the centerline of the vehicle. The rear suspension assembly further includes a suspension member configured to control toe of the at least one rear ground-engaging member.

17 Claims, 27 Drawing Sheets

Related U.S. Application Data

(60) Provisional application No. 62/608,952, filed on Dec. 21, 2017.

(52) U.S. Cl.
CPC ............... *B60G 2200/1442* (2013.01); *B60G 2200/182* (2013.01); *B60G 2200/462* (2013.01); *B60G 2204/148* (2013.01); *B60G 2206/11* (2013.01); *B60G 2206/50* (2013.01); *B60G 2300/07* (2013.01); *B60Y 2200/20* (2013.01); *B60Y 2400/86* (2013.01)

(58) Field of Classification Search
CPC ........ B60G 2200/462; B60G 2204/148; B60G 2206/11; B60G 2206/50; B60G 2300/07; B60Y 2200/20; B60Y 2400/86
See application file for complete search history.

(56) References Cited

U.S. PATENT DOCUMENTS

| | | | |
|---|---|---|---|
| 2,800,947 A | 7/1957 | Thiem | |
| 3,227,488 A | 1/1966 | Kosbab et al. | |
| 3,379,455 A * | 4/1968 | Dahlstrom | B60G 3/20 280/89 |
| 3,704,029 A * | 11/1972 | Bailleux | B60G 7/02 267/257 |
| 3,709,314 A | 1/1973 | Hickey | |
| 3,804,055 A | 4/1974 | Nishikawa et al. | |
| 3,901,092 A | 8/1975 | Romick | |
| 3,916,639 A | 11/1975 | Atkinson | |
| 4,373,604 A | 2/1983 | Lunn et al. | |
| 4,381,828 A | 5/1983 | Lunn et al. | |
| 4,632,207 A | 12/1986 | Moore | |
| 4,699,418 A | 10/1987 | Plavetich | |
| 4,758,018 A * | 7/1988 | Takizawa | B60G 7/00 280/124.109 |
| 4,932,709 A | 6/1990 | Wainwright | |
| 4,969,661 A | 11/1990 | Omura | |
| 4,986,566 A * | 1/1991 | Nishino | B60R 19/00 280/124.145 |
| 4,989,894 A | 2/1991 | Winsor | |
| 5,176,398 A | 1/1993 | Kanai et al. | |
| 5,215,329 A | 6/1993 | Santo | |
| 5,269,589 A | 12/1993 | Brothers | |
| 5,516,179 A | 5/1996 | Tidwell | |
| 6,000,296 A | 12/1999 | Sundquist | |
| 6,003,950 A | 12/1999 | Larsson | |
| 6,129,405 A | 10/2000 | Miyahara et al. | |
| 6,386,629 B1 | 5/2002 | Severinski et al. | |
| 6,648,393 B1 | 11/2003 | Milnar et al. | |
| 6,702,309 B2 | 3/2004 | Cho | |
| 6,799,781 B2 | 10/2004 | Rasidescu | |
| 6,851,691 B2 | 2/2005 | Rasidescu | |
| 7,104,580 B2 | 9/2006 | Clark et al. | |
| 7,108,319 B2 | 9/2006 | Hartwich | |
| 7,192,088 B1 | 3/2007 | Trombley et al. | |
| 7,410,182 B1 * | 8/2008 | Giese | B60G 3/20 280/124.135 |
| 7,467,823 B2 | 12/2008 | Hartwich | |
| 7,635,138 B2 | 12/2009 | Imre | |
| 7,654,544 B2 | 2/2010 | Lounsberry | |
| 7,748,766 B2 | 7/2010 | Villeminey | |
| 7,784,805 B2 | 8/2010 | Morgan | |
| 7,798,505 B2 | 9/2010 | Neag | |
| 7,828,050 B2 | 11/2010 | Esaki | |
| 7,837,203 B1 | 11/2010 | Schmidt | |
| 7,891,684 B1 | 2/2011 | Luttinen | |
| 8,109,308 B2 | 2/2012 | Manesh et al. | |
| 8,176,957 B2 | 5/2012 | Manesh et al. | |
| 8,235,462 B2 | 8/2012 | Bajic et al. | |
| 8,328,235 B2 | 12/2012 | Schneider et al. | |
| 8,517,135 B2 | 8/2013 | Schapf | |
| 8,678,464 B2 | 3/2014 | Smith et al. | |
| 8,727,057 B2 | 5/2014 | Park | |
| 8,746,719 B2 | 6/2014 | Safranski | |
| 8,764,039 B2 | 7/2014 | Keller et al. | |
| 8,944,449 B2 | 2/2015 | Hurd et al. | |
| 8,950,824 B2 | 2/2015 | Eck | |
| 9,108,470 B2 | 8/2015 | Tercha et al. | |
| 9,180,801 B2 | 11/2015 | Kennedy | |
| 9,393,894 B2 | 7/2016 | Steinmeiz et al. | |
| 9,566,858 B2 | 2/2017 | Hicke et al. | |
| 9,713,975 B2 | 7/2017 | Berry | |
| 9,738,191 B2 | 8/2017 | Langensiepen | |
| 9,764,039 B2 | 9/2017 | Thanos | |
| 9,776,481 B2 | 10/2017 | Deckard et al. | |
| 9,908,445 B2 | 3/2018 | Park et al. | |
| 9,981,519 B2 | 5/2018 | Despres-Nadeau et al. | |
| 10,604,038 B2 | 3/2020 | Li et al. | |
| 11,027,631 B2 | 6/2021 | Hoshi | |
| 11,285,807 B2 | 3/2022 | Galsworthy et al. | |
| 2002/0005649 A1 | 1/2002 | Hofmann et al. | |
| 2002/0040822 A1 | 4/2002 | Gagnon et al. | |
| 2003/0038444 A1 | 2/2003 | Chang | |
| 2003/0085062 A1 | 5/2003 | Bowen | |
| 2003/0102699 A1 | 6/2003 | Aoki | |
| 2004/0129489 A1 | 7/2004 | Brasseal | |
| 2004/0135338 A1 | 7/2004 | Asteggiano | |
| 2004/0195797 A1 | 10/2004 | Nash et al. | |
| 2004/0222657 A1 | 11/2004 | Welch et al. | |
| 2005/0006868 A1 | 1/2005 | Ziech | |
| 2005/0035618 A1 | 2/2005 | Toth et al. | |
| 2005/0073126 A1 | 4/2005 | Seki | |
| 2005/0113203 A1 | 5/2005 | Mueller et al. | |
| 2005/0140110 A1 | 6/2005 | Lee | |
| 2005/0275183 A1 | 12/2005 | Amano | |
| 2006/0091636 A1 | 5/2006 | Shelton | |
| 2006/0138812 A1 | 6/2006 | Aoki | |
| 2006/0220411 A1 | 10/2006 | Pathak et al. | |
| 2006/0237938 A1 | 10/2006 | Imre | |
| 2006/0283654 A1 | 12/2006 | Krisher | |
| 2006/0289217 A1 | 12/2006 | Schlaf et al. | |
| 2007/0007742 A1 | 1/2007 | Allen | |
| 2007/0096420 A1 | 5/2007 | Lounsberry | |
| 2007/0114747 A1 | 5/2007 | Morgan | |
| 2007/0157899 A1 | 7/2007 | Seufert et al. | |
| 2007/0176386 A1 | 8/2007 | Schlangen | |
| 2008/0135320 A1 | 6/2008 | Matthies | |
| 2009/0072572 A1 | 3/2009 | Scheinberg | |
| 2009/0195037 A1 | 8/2009 | Plavetich et al. | |
| 2009/0243325 A1 | 10/2009 | Villeminey | |
| 2011/0062738 A1 | 3/2011 | Lindley et al. | |
| 2011/0109128 A1 | 5/2011 | Axakov | |
| 2011/0133533 A1 | 6/2011 | Herzberg | |
| 2011/0227385 A1 | 9/2011 | Holder | |
| 2012/0031688 A1 | 2/2012 | Safranski et al. | |
| 2012/0187740 A1 | 7/2012 | Kim | |
| 2013/0105238 A1 | 5/2013 | Hall et al. | |
| 2013/0213157 A1 | 8/2013 | Martin et al. | |
| 2013/0240272 A1 | 9/2013 | Gass et al. | |
| 2013/0277937 A1 * | 10/2013 | Keller | B60G 3/202 280/124.128 |
| 2013/0337951 A1 | 12/2013 | Hasewend et al. | |
| 2014/0025246 A1 | 1/2014 | Hall et al. | |
| 2014/0077536 A1 | 3/2014 | Mather | |
| 2014/0103627 A1 * | 4/2014 | Deckard | B62D 27/065 411/362 |
| 2014/0124279 A1 * | 5/2014 | Schlangen | B60K 11/04 180/311 |
| 2014/0125025 A1 | 5/2014 | Lee | |
| 2014/0345964 A1 | 11/2014 | Nakaoka et al. | |
| 2015/0061275 A1 | 3/2015 | Deckard et al. | |
| 2015/0183286 A1 * | 7/2015 | Bruehl | B60G 7/005 280/124.135 |
| 2015/0274171 A1 | 10/2015 | Makabe et al. | |
| 2015/0343900 A1 * | 12/2015 | Schlangen | B60G 7/001 180/247 |
| 2016/0039260 A1 * | 2/2016 | Randle | B60G 3/26 280/86.751 |
| 2016/0176318 A1 | 6/2016 | Poulos et al. | |
| 2016/0305531 A1 | 10/2016 | Martin et al. | |
| 2016/0347137 A1 * | 12/2016 | Despres-Nadeau | B60G 3/202 |

(56) References Cited

U.S. PATENT DOCUMENTS

| | | |
|---|---|---|
| 2017/0008438 A1 | 1/2017 | Clark et al. |
| 2017/0057351 A1 | 3/2017 | Bandy |
| 2017/0075476 A1 | 3/2017 | Kwon et al. |
| 2017/0080977 A1 | 3/2017 | Schroeder et al. |
| 2017/0136874 A1 | 5/2017 | Harris et al. |
| 2017/0166255 A1 | 6/2017 | Peterson et al. |
| 2017/0225563 A1 | 8/2017 | Hwang |
| 2018/0147902 A1 | 5/2018 | Hu et al. |
| 2018/0264902 A1 | 9/2018 | Schroeder et al. |
| 2018/0281861 A1 | 10/2018 | Gordon |
| 2019/0093745 A1 | 3/2019 | Younggren et al. |
| 2019/0152357 A1 | 5/2019 | Harrison et al. |
| 2019/0193501 A1 | 6/2019 | Brady et al. |
| 2019/0210457 A1 | 7/2019 | Galsworthy et al. |
| 2019/0210484 A1 | 7/2019 | Deckard et al. |
| 2019/0248405 A1* | 8/2019 | Bennett .................. B62D 5/04 |
| 2020/0025275 A1* | 1/2020 | Schroeder ............... F16D 3/841 |
| 2020/0130450 A1* | 4/2020 | Nakashima ............... B60G 3/20 |
| 2021/0339591 A1* | 11/2021 | Li .......................... B60G 7/001 |
| 2022/0134907 A1 | 5/2022 | Deckard et al. |

FOREIGN PATENT DOCUMENTS

| | | |
|---|---|---|
| DE | 10252155 A1 | 5/2004 |
| DE | 102006061331 A1 | 11/2007 |
| DE | 102006061816 A1 | 6/2008 |
| DE | 102007048700 A1 | 4/2009 |
| DE | 102008029261 A1 | 12/2009 |
| DE | 102015222761 A1 | 5/2017 |
| FR | 2443964 A1 | 7/1980 |
| FR | 2645810 A1 | 10/1990 |
| FR | 2704494 A1 | 11/1994 |
| FR | 2818205 A1 | 6/2002 |
| FR | 2834945 A1 | 7/2003 |
| FR | 2886587 A1 | 12/2006 |
| FR | 2886593 A1 | 12/2006 |
| FR | 2889122 A1 | 2/2007 |
| FR | 2889825 A3 | 2/2007 |
| FR | 2949214 A1 | 2/2011 |
| GB | 2388313 A | 11/2003 |
| JP | 62-134130 A | 6/1987 |
| JP | 62-134310 A | 6/1987 |
| JP | 63-101112 A | 5/1988 |
| JP | 63-134310 A | 6/1988 |
| JP | 2003-080982 A | 3/2003 |
| WO | 2015/190274 A1 | 12/2015 |

OTHER PUBLICATIONS

International Preliminary Report on Patentability issued by The International Bureau of WIPO, dated Jul. 7, 2020, for International Patent Application No. PCT/US2019/012276; 7 pages.

International Preliminary Report on Patentability issued by The International Bureau of WIPO, dated Jun. 23, 2020, for International Patent Application No. PCT/US2018/066774; 13 pages.

International Search Report and Written Opinion received for PCT Patent Application No. PCT/US2018/066774, dated May 27, 2019, 19 pages.

International Search Report and Written Opinion received for PCT Patent Application No. PCT/US2019/012276, dated Mar. 26, 2019, 9 pages.

International Search Report issued by the European Patent Office, dated Jul. 5, 2019, for International Patent Application No. PCT/US2019/012868; 6 pages.

Invitation to Pay Additional Fees and Annex to Form PCT/ISA/206, issued by the European Patent Office, mailed Apr. 4, 2019, for International Patent Application No. PCT/2018/066774; 16 pages.

Written Opinion issued by the European Patent Office, dated Jul. 5, 2019, for International Patent Application No. PCT/US2019/012868; 11 pages.

International Preliminary Reporton Patentability received for PCT Patent Application No. PCT/US2019/012868, dated Jul. 23, 2020, 11 pages.

Machine translation of FR '122 from espacement.com http://translationportal .epo.org/emtp/translate/?ACTION=description-retrieval&COUNTRY=FR&ENGINE=google&FORMAT=docdb&KIND=A1&LOCALE=en_EP&NUMBER=2889122&OPS=ops.epo.org/3.2&SRCLANG=fr&TRGLANG=en (Year: 2007).

Machine translation of FR 2889122 (Year: 2007).

Office Action issued by the Canadian Intellectual Property Office, dated Aug. 19, 2021, for Canadian Patent Application No. 3,088,961; 5 pages.

* cited by examiner

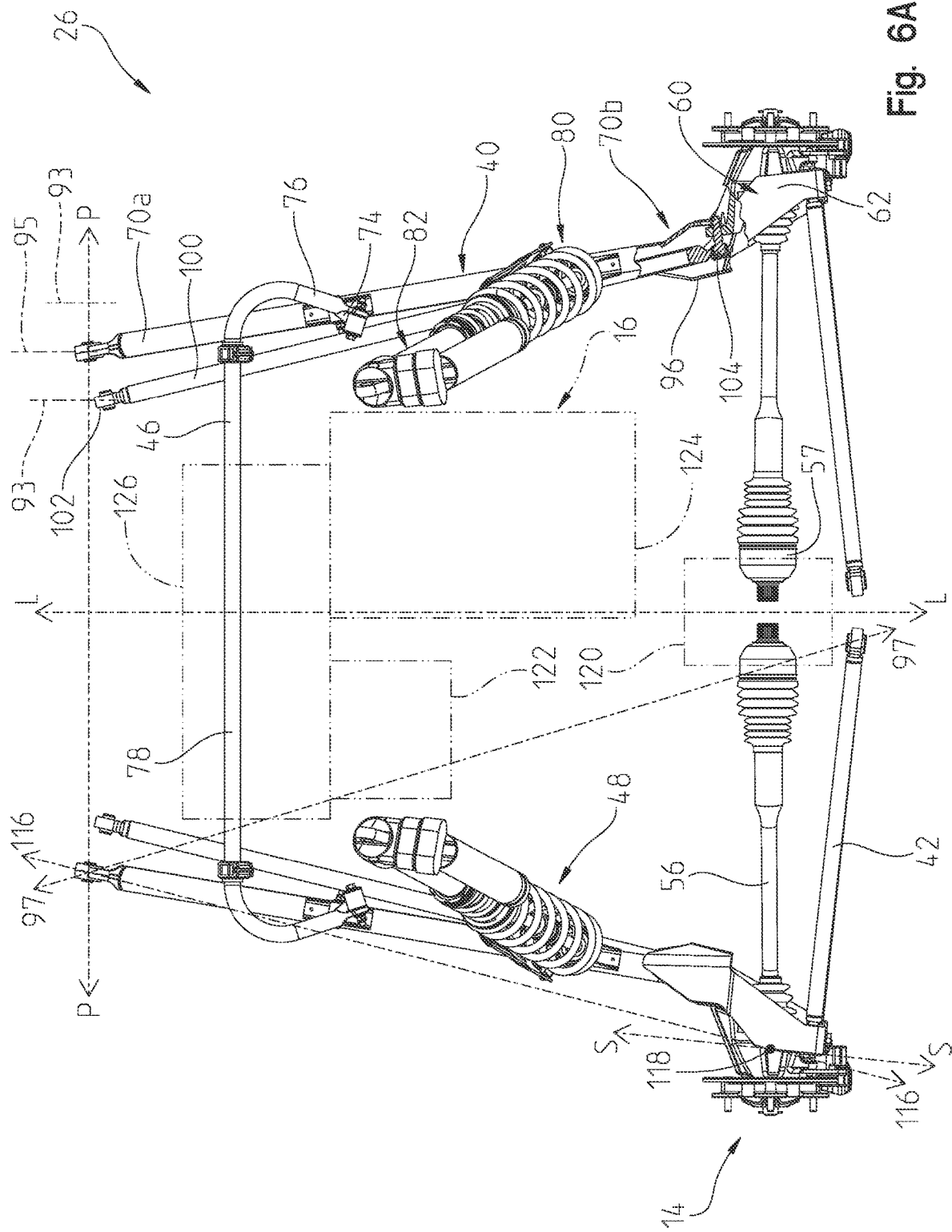

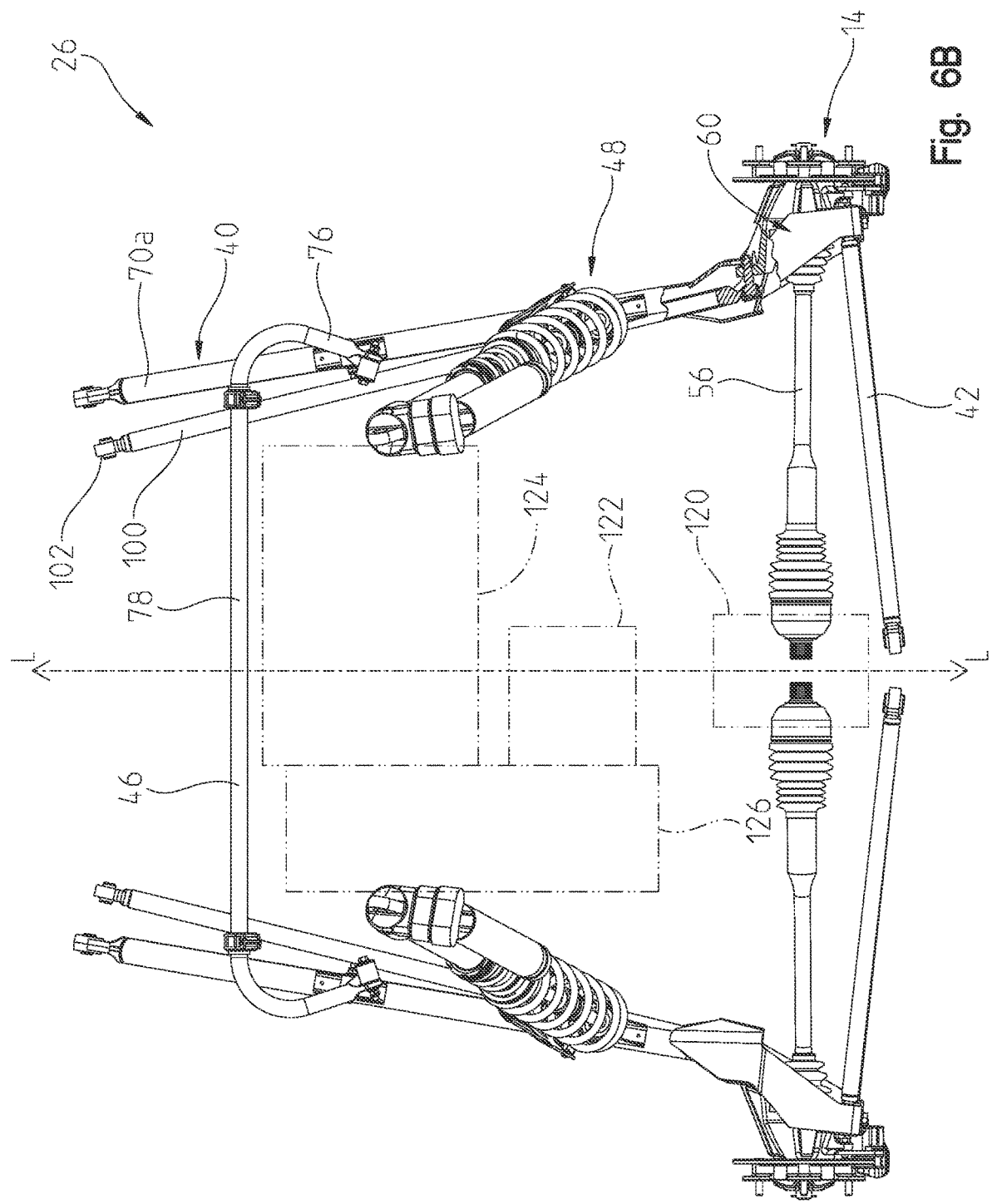

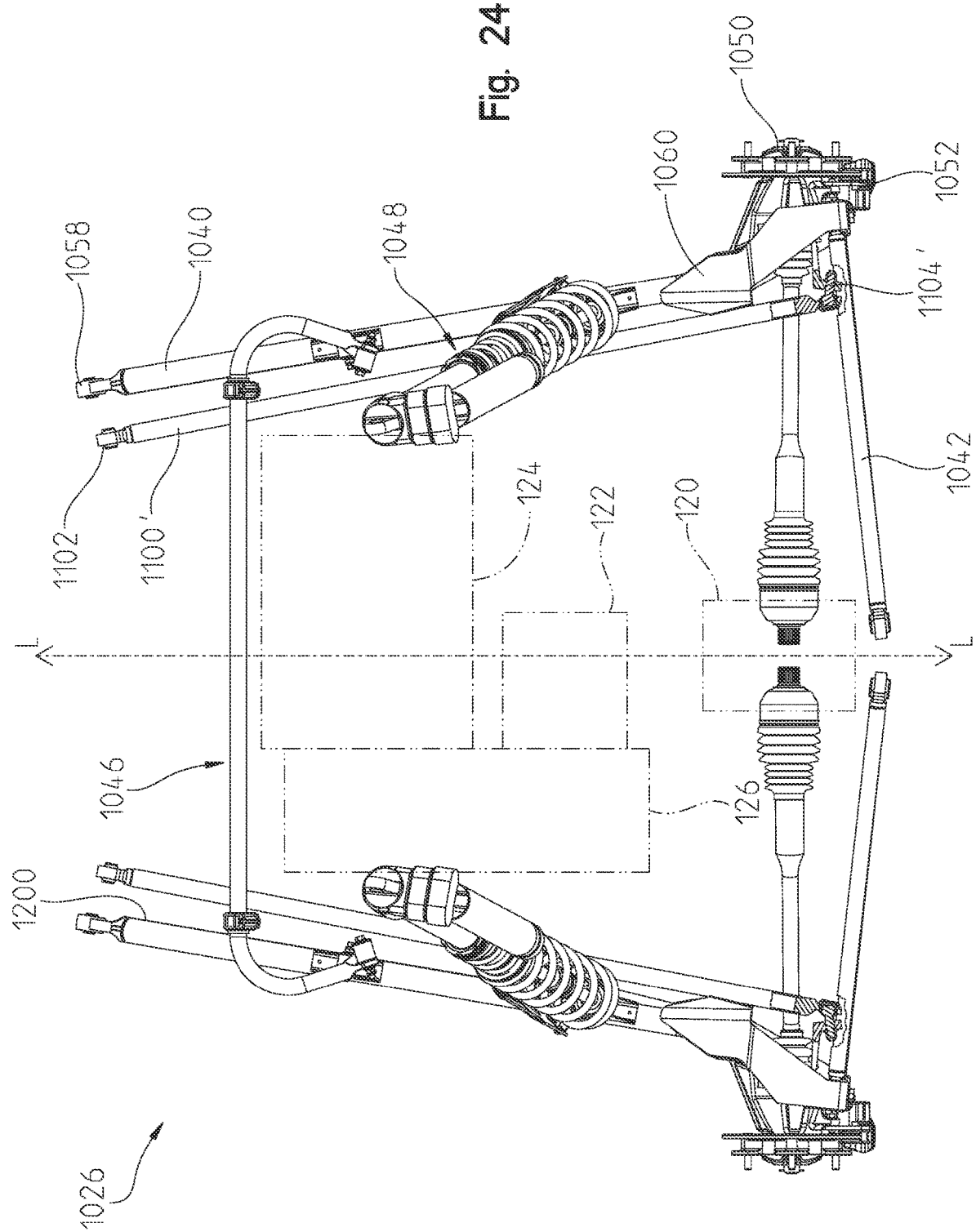

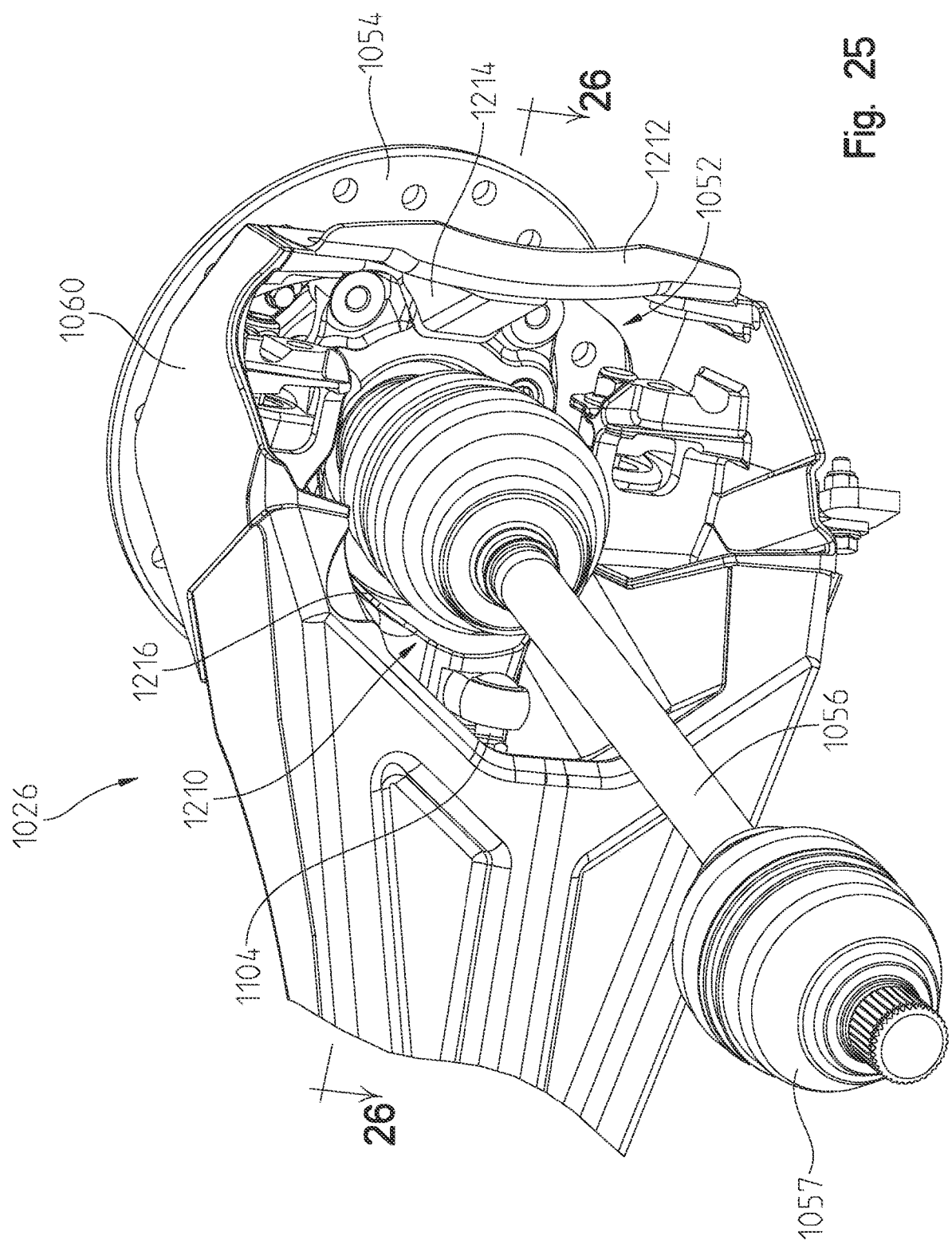

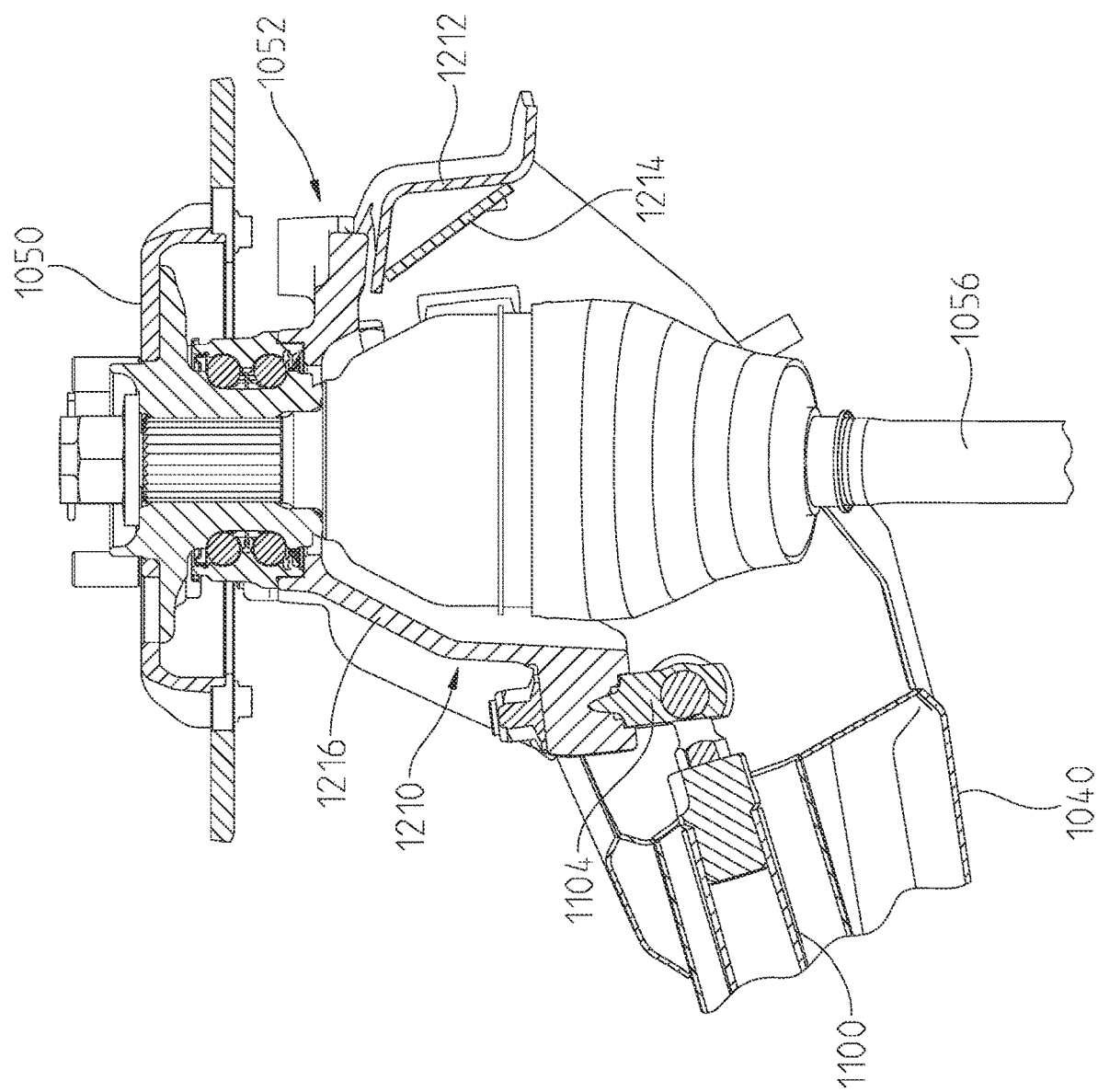

REAR SUSPENSION ASSEMBLY FOR A VEHICLE

CROSS-REFERENCE TO RELATED APPLICATIONS

The present application is a divisional of U.S. patent application Ser. No. 16/226,797, filed Dec. 20, 2018, which claims the benefit of U.S. Provisional Patent Application Ser. No. 62/608,952, filed on Dec. 21, 2017, and entitled "REAR SUSPENSION ASSEMBLY FOR A VEHICLE", the complete disclosure of which is expressly incorporated by reference herein.

FIELD OF THE DISCLOSURE

The present disclosure relates to a rear suspension assembly for a utility vehicle and, more particularly, to a rear suspension assembly including a suspension member configured to control toe of the rear ground-engaging members during suspension travel.

BACKGROUND OF THE DISCLOSURE

On-road and off-road vehicles include a rear suspension assembly. For example, in the context of off-road vehicles, various embodiments of a rear suspension assembly may include trailing arms which generally extend in a forward-aft direction and control arms or radius rods which generally extend in a lateral direction.

However, despite the inclusion of a trailing arm and/or radius rod, the rear wheel may toe in or toe out when the vehicle rebounds at full compression. In this way, the vehicle may not rebound with the rear wheels facing in longitudinal direction. As such, there is a need for a rear suspension assembly which decreases the toe change, especially when the vehicle rebounds and the rear suspension assembly is at a full compression position.

SUMMARY OF THE DISCLOSURE

According to an illustrative embodiment of the present disclosure, a utility vehicle comprises a frame assembly extending longitudinally along a centerline of the vehicle, at least one front ground-engaging member supporting the frame assembly, at least one rear ground-engaging member supporting the frame assembly, and a rear suspension assembly operably coupled to the frame assembly and the at least one rear ground-engaging member. The rear suspension assembly comprises a trailing arm generally extending longitudinally and operably coupled to the frame assembly and the at least one rear ground-engaging member. The rear suspension assembly also comprises an upper radius rod extending in a generally lateral direction relative to the centerline of the vehicle and operably coupled to the trailing arm. The rear suspension assembly further comprises a lower radius rod extending in a generally lateral direction relative to the centerline of the vehicle and operably coupled to the trailing arm. Additionally, the rear suspension assembly comprises a suspension member configured to control toe of the at least one rear ground-engaging member and generally extending longitudinally and operably coupled to the at least one rear ground-engaging member.

According to another embodiment of the present disclosure, a utility vehicle comprises a frame assembly extending longitudinally along a centerline of the vehicle, at least one front ground-engaging member supporting the frame assembly, and at least one rear ground-engaging member supporting the frame assembly. The at least one rear ground-engaging member includes a knuckle. The utility vehicle also comprises a rear suspension assembly operably coupled to the frame assembly and the at least one rear ground-engaging member. The rear suspension assembly comprises a trailing arm generally extending longitudinally and operably coupled to the frame assembly and the knuckle. Also, the rear suspension assembly comprises an upper radius rod extending in a generally lateral direction relative to the centerline of the vehicle and operably coupled to the trailing arm. Additionally, the rear suspension assembly comprises a lower radius rod extending in the generally lateral direction relative to the centerline of the vehicle and operably coupled to the trailing arm. The rear suspension assembly further comprises a suspension member operably coupled to the knuckle and configured to control toe of the at least one rear ground-engaging member. The suspension member is positioned vertically intermediate upper and lower surfaces of the trailing arm.

In another illustrative embodiment of the present disclosure, a utility vehicle comprises a frame assembly extending longitudinally along a centerline of the vehicle, at least one front ground-engaging member supporting the frame assembly, at least one rear ground-engaging member supporting the frame assembly, and a rear suspension assembly operably coupled to the frame assembly and the at least one rear ground-engaging member. The rear suspension assembly comprises an upper radius rod and a lower radius rod both extending in a generally lateral direction relative to the centerline of the vehicle. The rear suspension assembly also comprises a trailing arm operably coupled with the upper and lower radius rods and extending in a generally longitudinal direction. Additionally, the rear suspension assembly comprises a suspension member operably coupled to the at least one rear ground-engaging member and configured to control toe of the at least one rear ground-engaging member. The suspension member extends generally longitudinally between a forward extent thereof and a rearward extent thereof. At least a portion of the trailing arm is positioned laterally inward of a line extending between the forward and rearward extents of the suspension member.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings.

FIG. 6A is a top view of the rear suspension assembly of FIG. 2;

FIG. 6B is a further top view of the rear suspension assembly of FIG. 2;

FIG. 24 is a further top view of the rear suspension assembly of FIG. 17 in relation to a portion of the powertrain assembly of the vehicle of FIG. 1;

FIG. 25 is a rear left perspective view of a stop member configured to limit the rotation of the tire under certain conditions; and FIG. 26 is a cross-sectional view of the stop member of FIG. 25, taken along line 26-26 of FIG. 25.

Figure 1:
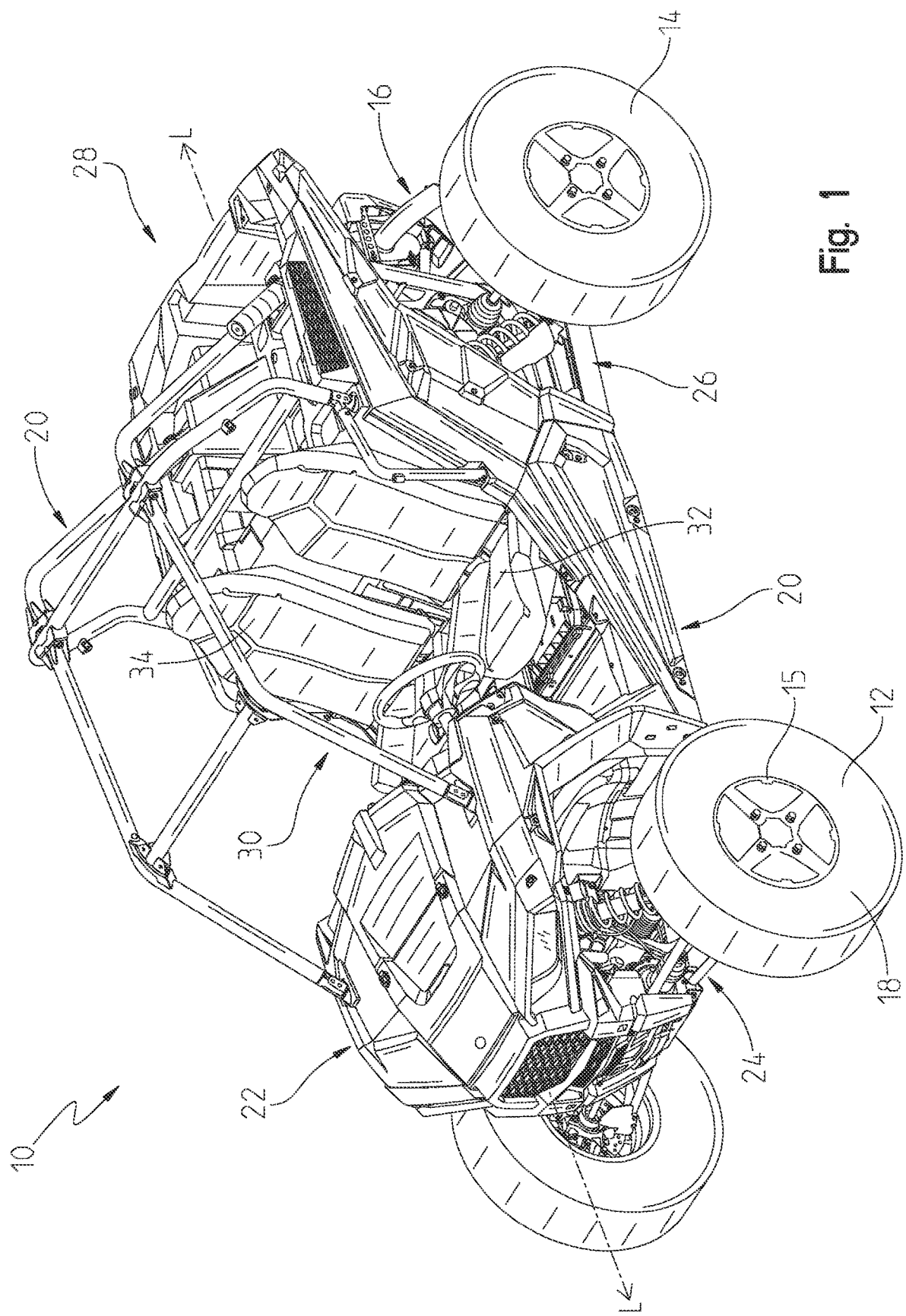
FIG. 1 is a front left perspective view of a utility vehicle of the present disclosure.
Figure 2:
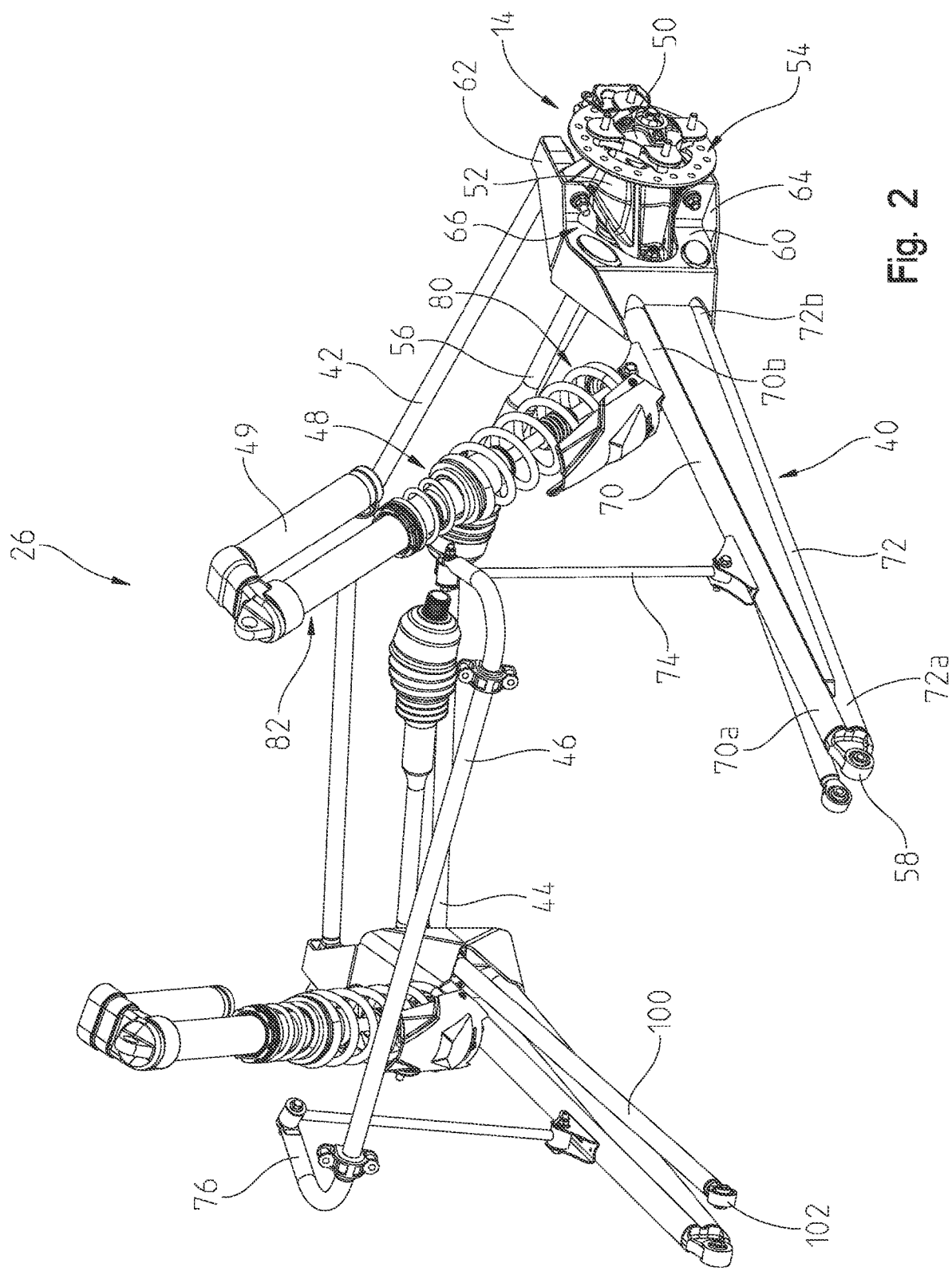
FIG. 2 is a front left perspective view of a rear suspension assembly of the vehicle of FIG. 1 having a longitudinal suspension member configured to control toe of the rear ground-engaging members.
Figure 3:
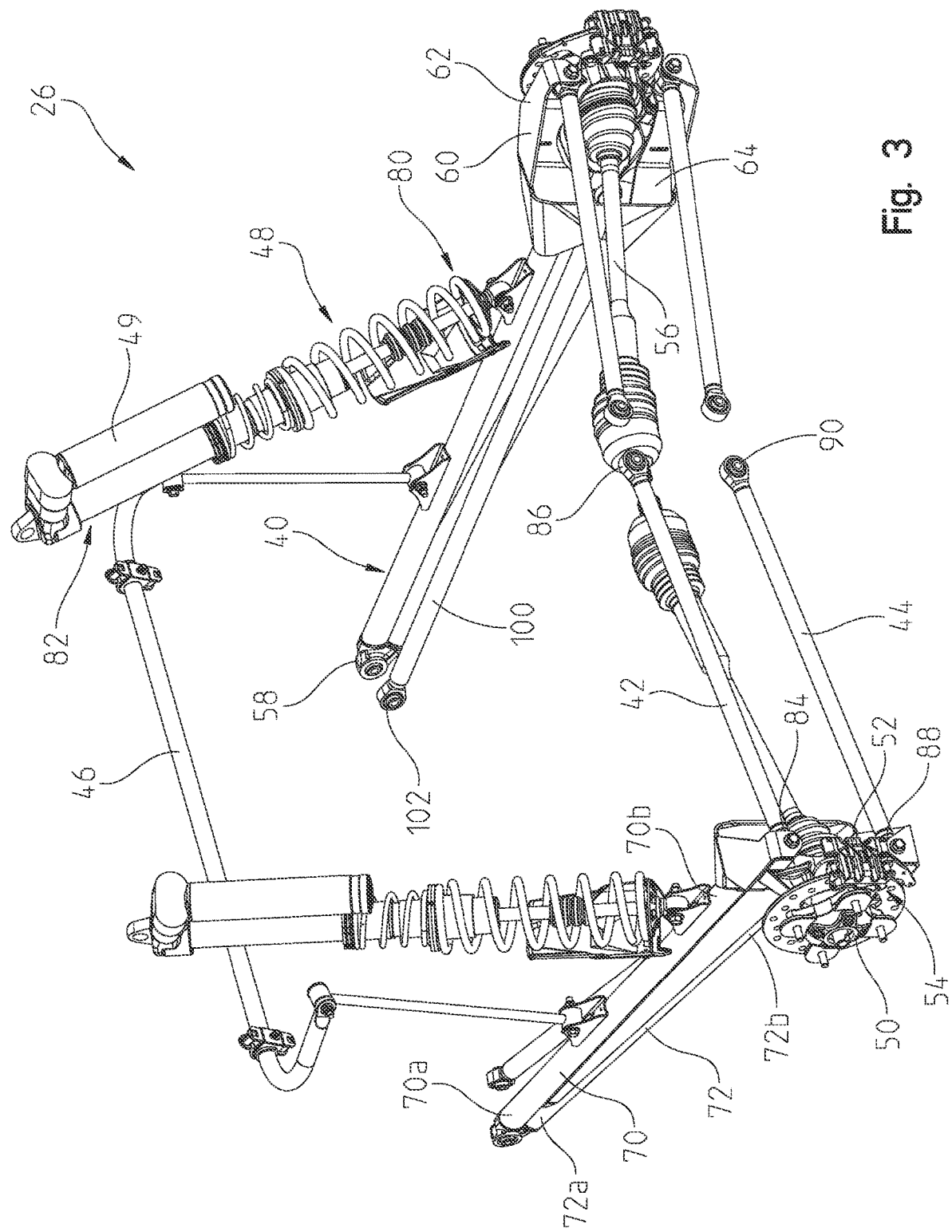
FIG. 3 is a rear left perspective view of the rear suspension assembly of FIG. 2.
Figure 4:
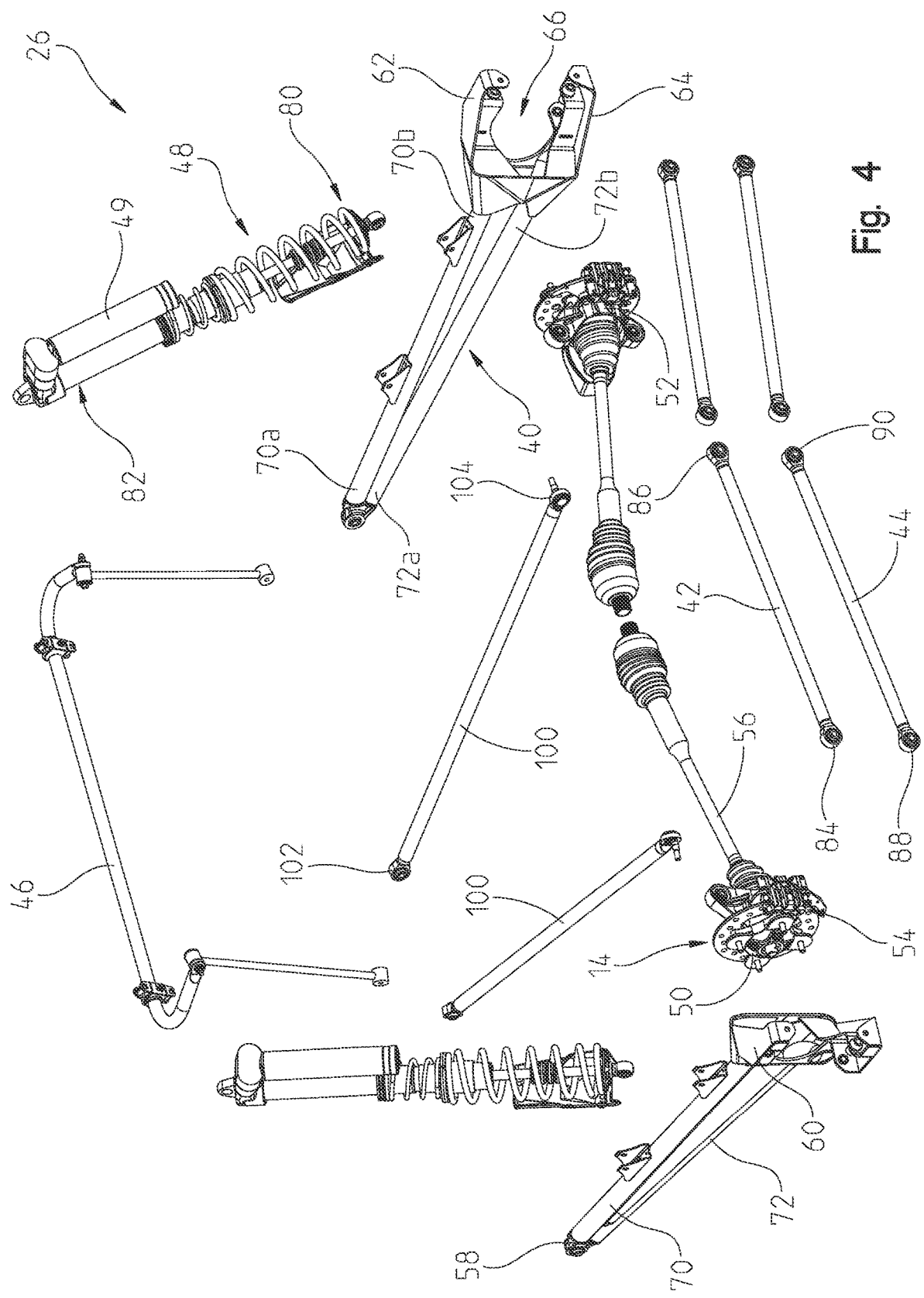
FIG. 4 is a rear exploded view of the rear suspension assembly of FIG. 2.
Figure 5:
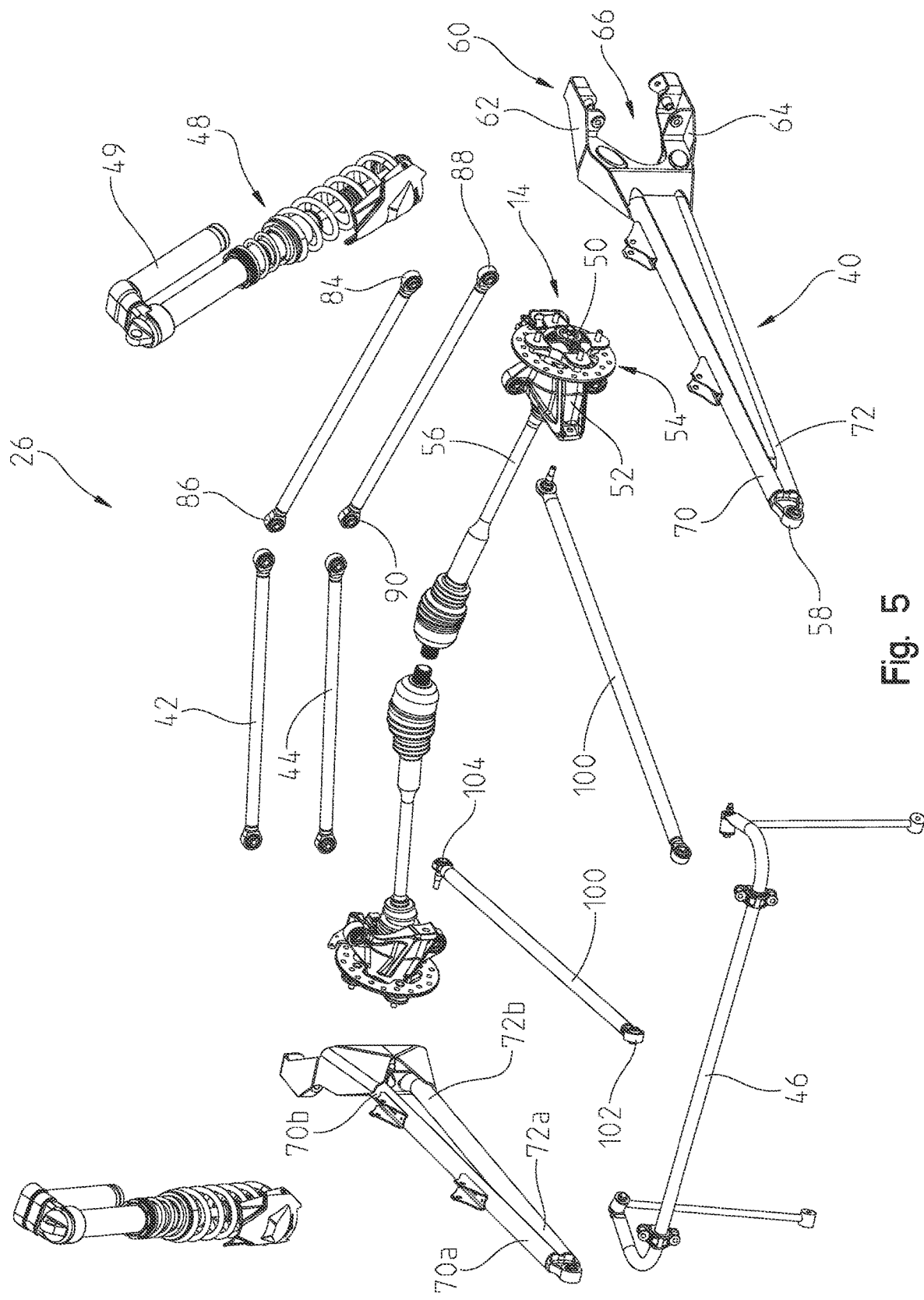
FIG. 5 is a front exploded view of the rear suspension assembly of FIG. 2.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to utility vehicles, certain features described herein may be applied to other applications such as all-terrain vehicles, snowmobiles, motorcycles, mopeds, etc.

Referring to FIG. 1, an illustrative embodiment of a utility vehicle 10 is shown which is configured to traverse a variety of terrains, including mud, rocks, dirt, and other trail or off-road conditions. Vehicle 10 may be referred to as a utility vehicle ("UV"), an all-terrain vehicle ("ATV"), or a side-by-side vehicle ("SxS") and is configured for travel over various terrains or surfaces. More particularly, vehicle 10 may be configured for military, industrial, agricultural, or recreational applications.

Vehicle 10 includes a plurality of ground-engaging members, including front ground-engaging members 12 (e.g., front wheels) and rear-ground engaging members 14 (e.g., rear wheels), a powertrain assembly 16, a frame assembly 20, a plurality of body panels 22 coupled to frame assembly 20, a front suspension assembly 24 supported by a front portion of frame assembly 20, a rear suspension assembly 26, 26' supported by a rear portion of frame assembly 20, and a rear cargo area 28 supported by the rear portion of frame assembly 20. As shown in FIG. 1, vehicle 10 extends between front and rear ground-engaging members 12, 14 in a longitudinal direction along a longitudinal vehicle centerline L. As shown best in FIG. 6A, powertrain assembly 16 may include a front final drive member (not shown), a rear final drive member 120, a gearbox or shiftable transmission 122, an engine 124, and a continuously variable transmission ("CVT") 126. A prop shaft or other mechanism may extend between various components of powertrain assembly 16 to provide motive power to front and/or rear ground-engaging members 12, 14. Additional details of powertrain assembly 16 may be disclosed in U.S. Patent Application Ser. No. 62/613,796, filed Jan. 5, 2018, the complete disclosure of which is expressly incorporated by reference here.

In one embodiment, one or more ground-engaging members 12, 14 may be replaced with tracks, such as the PROSPECTOR II tracks available from Polaris Industries, Inc. located at 2100 Highway 55 in Medina, Minn. 55340, or non-pneumatic tires as disclosed in any of U.S. Pat. No. 8,109,308, filed on Mar. 26, 2008; U.S. Pat. No. 8,176,957, filed on Jul. 20, 2009; and U.S. Pat. No. 9,108,470, filed on Nov. 17, 2010; and U.S. Patent Application Publication No. 2013/0240272, filed on Mar. 13, 2013, the complete disclosures of which are expressly incorporated by reference herein.

Referring still to FIG. 1, vehicle 10 includes an operator area 30 supported by frame assembly 20 and which includes seating for at least an operator and a passenger. Illustratively, one embodiment of vehicle 10 includes an operator seat 32 and a front passenger seat 34. More particularly, operator seat 32 and front passenger seat 34 are in a side-by-side arrangement. Operator seat 32 includes a seat bottom, illustratively a bucket seat, and a seat back. Similarly, front passenger seat 34 includes a seat bottom, illustratively a bucket seat, and a seat back. Additional details of vehicle 10 may be disclosed in U.S. patent application Ser. No. 14/051,700, filed Oct. 11, 2013; U.S. patent application Ser. No. 14/477,589, filed Sep. 4, 2014; and U.S. patent application Ser. No. 14/577,908, filed Dec. 19, 2014; the complete disclosures of which are expressly incorporated by reference herein.

Referring to FIGS. 2-9, rear suspension assembly 26 is shown. Rear suspension assembly 26 is a trailing arm-type suspension generally comprised of trailing arms 40, an upper or first radius rod or control arm 42, a lower or second radius rod or control arm 44, a torsion or sway bar 46, and shock absorbers 48. Illustratively, both a right and left side of vehicle 10 includes trailing arm 40, radius rods 42, 44, and shock absorbers 48 such that both right and left rear ground-engaging members 14 are each operably coupled to one trailing arm 40, upper and lower radius rods 42, 44, and one shock absorber 48. More particularly, each of rear ground-engaging members 14 includes a wheel hub 50, a knuckle 52, and a brake assembly 54, and at least trailing arms 40 and radius rods 42, 44 are operably coupled to knuckle 52.

Additionally, each of rear ground-engaging members 14 includes a rear axle or half shaft 56 extending between rear final drive member 120 (FIG. 6A) and knuckle 52. Rear axles 56 are configured to rotate rear ground-engaging members 14 during operation of vehicle 10. As shown best in FIG. 6A, rear axles 56 extend laterally and may be generally perpendicular to centerline L of vehicle 10.

Referring again to FIGS. 2-9, trailing arms 40 include a first coupler 58 positioned at a forward portion thereof and a second coupler 60 positioned at a rearward portion thereof. First coupler 58 is configured to operably couple trailing arms 40 to frame assembly 20 (FIG. 1) and second coupler 60 is configured to operably couple trailing arms 40 to rear ground-engaging member 14. First coupler 58 is configured to allow trailing arms 40 to pivot or rotate in a generally vertically direction relative to frame assembly 20. Second coupler 60 includes an upper portion 62, a lower portion 64, and a recessed portion 66 positioned therebetween. Illustratively, recessed portion 66 is configured to receive a portion of knuckle 52 and second coupler 60 may be coupled to any portion of rear ground-engaging member 14. In this way, trailing arm 40 is operably coupled to knuckle 52 of rear ground-engaging member 14 through second coupler 60.

In one embodiment, trailing arms 40 are configured to extend in a generally longitudinal or forward-aft direction between first and second couplers 58, 60. More particularly, trailing arms 40 extend generally longitudinally because trailing arms 40 may be generally parallel to centerline L of vehicle 10 and/or may have a longitudinal directional component angled less than 45° relative to centerline L. Through couplers 58, 60, trailing arms 40 are configured to pivot generally vertically during operation of vehicle 10, especially as vehicle 10 traverses various terrain.

Each of trailing arms 40 may be formed through a stamping process and comprised of a single metallic component. Alternatively, and as shown in FIGS. 2-9, each of trailing arms 40 may be comprised of a plurality of components integrally or removably coupled together, such as a first suspension portion or member 70 defining an upper surface of trailing arm 40 and a second suspension portion or member 72 defining a lower surface of trailing arm 40. A forward portion 70a, 72a of both first and second suspension members 70, 72 may be coupled to first coupler 58 and a rearward portion 70b, 72b of both first and second suspension members 70, 72 may be operably coupled to knuckle 52 through second coupler 60.

Illustratively, rearward portion 70b may be coupled to upper portion 62 of second coupler 60 and rearward portion 72b may be coupled to lower portion 64 of second coupler 60. In this way, first and second suspension members 70, 72 may be positioned forward of rear axles 56. In one embodiment, first and second suspension members 70, 72 generally define a triangular configuration with first and second couplers 58, 60 such that forward portions 70a, 72a of first and second suspension members 70, 72 are angled towards each other at first coupler 58 while rearward portions 70b, 72b of first and second suspension members 70, 72 are angled away from each other.

Referring still to FIGS. 2-9, torsion or stabilizer bar 46 of rear suspension assembly 26 may be operably coupled to first suspension member 70 through link arms 74. Link arms 74 may extend in a generally vertical direction between an upper surface of first suspension member 70 and a rearward portion 76 of torsion bar 46. Illustrative torsion bar 46 includes a forward portion 78 positioned forward of and coupled to rearward portions 76 such that torsion bar 46 generally defines a curved or U-shaped configuration. Both forward portion 78 and rearward portions 76 are at a vertically higher or greater position on vehicle 10 than trailing arms 40 and at least rearward portions 76 are partially positioned directly above a portion of trailing arms 40. Through link arms 74, torsion bar 46 is configured to move relative to trailing arms 40.

As shown in FIG. 6A, torsion bar 46 may be positioned directly vertically above CVT 126 and, more particularly, at least a portion of forward portion 78 of torsion bar 46 is positioned directly above CVT 126. Illustratively, at least forward portion 78 of torsion bar 46 is positioned entirely forward of engine 124, shiftable transmission 122, and rear final drive member 120. Rearward portions 76 may be positioned forward of at least a portion of engine 124 and shiftable transmission 122.

Referring to FIG. 6B, when powertrain assembly 16 includes an embodiment coupling CVT 126 laterally outward of engine 124, at least forward portion 78 of torsion bar 46 is positioned entirely forward of CVT 126, engine 124, and transmission 122. Additionally, rearward portions 76 of torsion bar 46 may be positioned forward of at least a portion of engine 124 and CVT 126 and positioned entirely forward of transmission 122. Additional details of powertrain assembly 16 may be disclosed in U.S. patent application Ser. No. 14/577,908, filed Dec. 19, 2014 and U.S. patent application Ser. No. 14/434,685, filed Apr. 9, 2015, the complete disclosures of which are expressly incorporated by reference herein.

As shown in FIGS. 2-9, shock absorbers 48 also may be operably coupled to first suspension member 70 of trailing arm 40. Illustratively, a lower end portion 80 of each of shock absorbers 48 is coupled to an upper surface of first suspension member 70 and an upper end portion 82 of each of shock absorbers 48 is coupled to a portion of frame assembly 20 (FIG. 1). Upper end portion 82 is angled forwardly relative to lower end portion 80, as shown best in FIG. 9. Additionally, and as shown best in FIGS. 6-8, upper end portion 82 may be angled inwardly in a lateral direction relative to lower end portion 80. In one embodiment, shock absorber 48 may be a gas-assist shock having a gas canister 49.

As is also shown in FIGS. 2-9, radius rods 42, 44 may be operably coupled with trailing arm 40 and knuckle 52 through second coupler 60. More particularly, upper radius rod 42 is pivotably coupled to upper portion 62 of second coupler 60 at a first coupling member 84 and is pivotably coupled to a portion (not shown) of frame assembly 20 at a second coupling member 86. Additionally, lower radius rod 44 is pivotably coupled to lower portion 64 of second coupler 60 at a first coupling member 88 and is pivotably coupled to a portion (not shown) of frame assembly 20 at a second coupling member 90. Coupling members 84, 88 may be positioned longitudinally rearward of rearward portions 70b, 72b of first and second suspension members 70, 72 of trailing arm 40.

Figure 7:
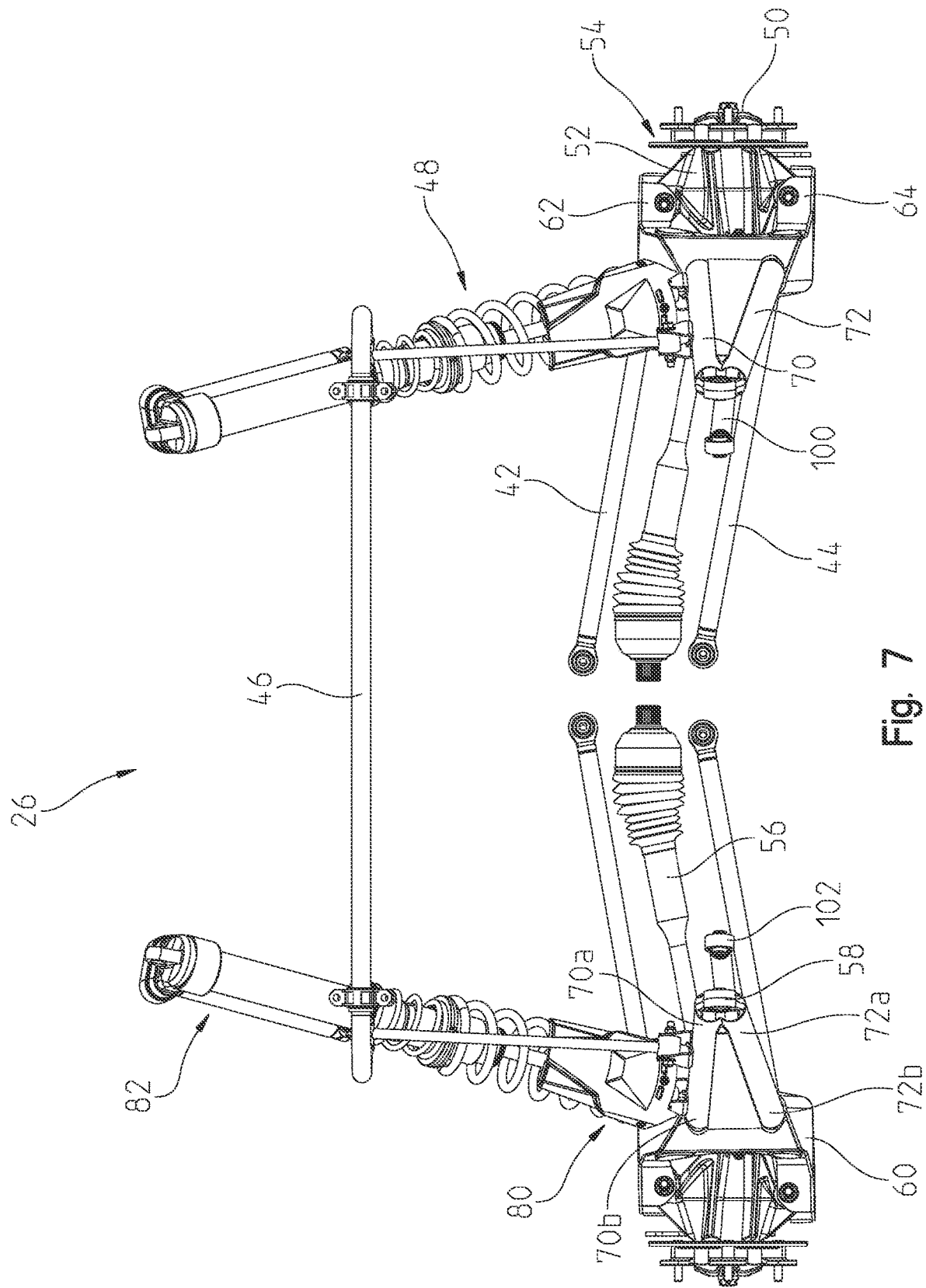
FIG. 7 is a front view of the rear suspension assembly of FIG. 2.
Figure 8:
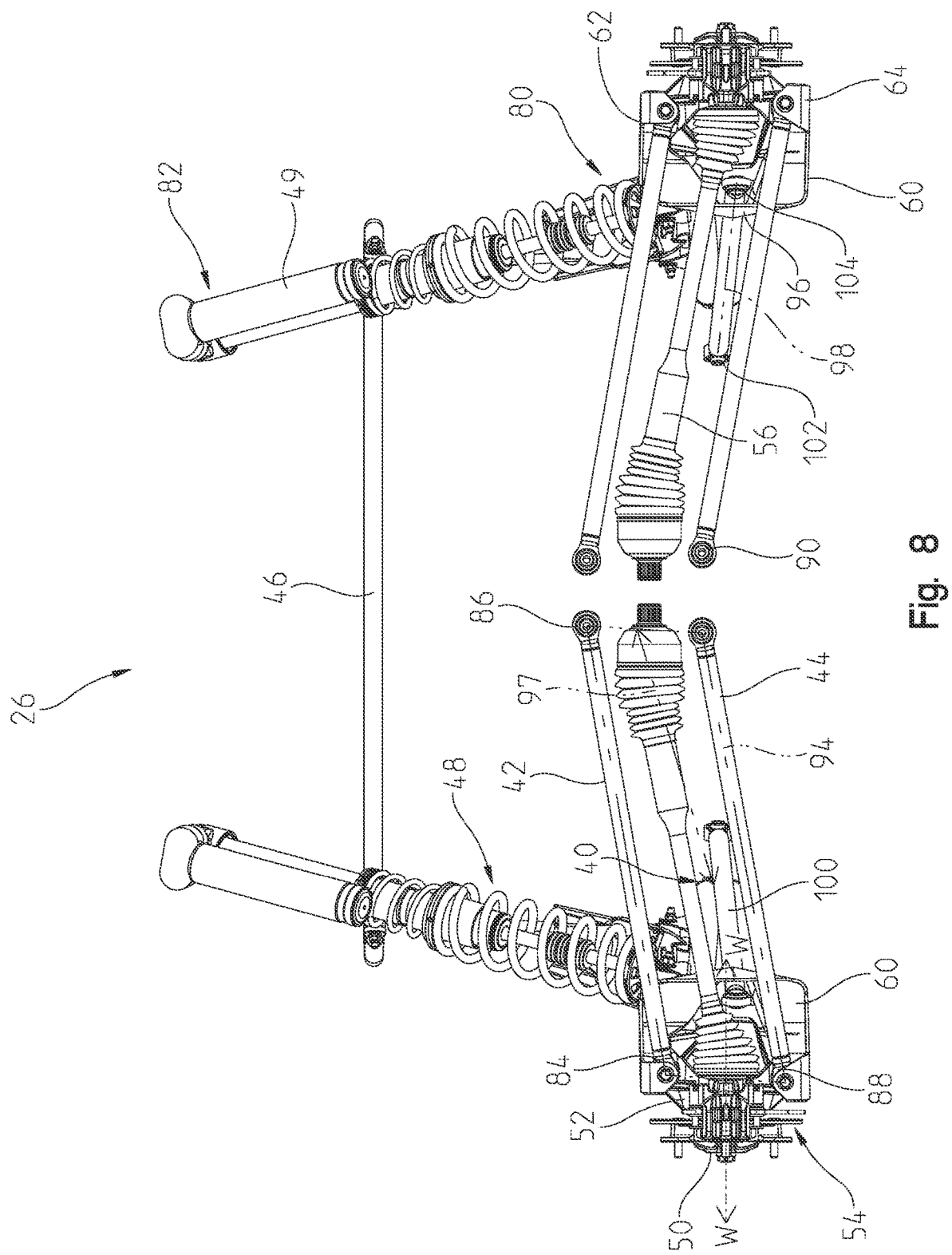
FIG. 8 is a rear view of the rear suspension assembly of FIG. 2.

As shown best in FIG. 6A, radius rods 42, 44 extend in a general lateral direction. In other words, radius rods 42, 44 have a laterally-extending component relative to centerline L. However, in one embodiment, radius rods 42, 44 are angled relative to a true lateral direction which would perpendicularly intersect centerline L but are angled less than 45° from the true lateral direction. Illustratively, radius rods 42, 44 may be swept rearwardly such that second coupling members 86, 90 are positioned rearwardly relative to first coupling members 84, 88. Additionally, and as shown in FIGS. 7 and 8, radius rods 42, 44 also are angled relative to a vertical axis (not shown) extending perpendicularly to centerline L (FIG. 6A). In this way, radius rods 42, 44 may be angled upwardly such that second coupling members 86, 90 are positioned at a higher or greater vertical position on vehicle 10 relative to first coupling members 84, 88.

During operation of vehicle 10, rear suspension assembly 26 is configured to move relative to frame assembly 20 (FIG. 1) between full extension and full compression positions. For example, when rear suspension assembly 26 is at full compression such that vehicle 10 has the least amount of ground clearance relative to the ground surface, vehicle 10 may operate best when rear ground-engaging members 14 are positioned forward and are not angled inwardly or outwardly relative to centerline L (FIG. 1) such that the toe change of rear ground-engaging member 14 is approximately zero. In other words, vehicle 10 may operate best in various positions of rear suspension assembly 26 when rear ground-engaging members 14 do not toe in or toe out, especially, for example, at when rear suspension assembly 26 is at the full compression position.

In order to maintain the position or toe of rear ground-engaging members 14 in a forward-facing direction during suspension travel, and especially when rear suspension assembly 26 is in the full compression position, rear suspension assembly 26 includes a suspension member 100 configured to control toe of rear ground-engaging members 14. In this way, suspension member 100 may be defined as a toe link or toe control member of rear suspension assembly 26. In one embodiment, suspension member 100 is positioned adjacent and laterally inwardly of trailing arms 40 such that suspension member 100 is positioned laterally closer to centerline L (FIG. 6A) than trailing arms 40. In one embodiment, suspension member 100 also is angled relative to trailing arms 40. Suspension member 100 also is positioned vertically intermediate first and second suspension members 70, 72 of trailing arm 40. As shown in at least the illustrative embodiment of FIG. 6A, because suspension member 100 is positioned laterally inward of trailing arms 40, at least a portion of torsion bar 46 is positioned directly vertically above a portion of suspension member 100.

Illustrative suspension member 100 extends generally longitudinally between a first or forward coupling member 102 and a second or rearward coupling member 104. More particularly, suspension member 100 may be generally parallel to centerline L of vehicle 10 or may have a longitudinal directional component angled 45° or less relative to centerline L. For example, suspension member 100 may be angled 0-45° relative to centerline L in that suspension member 100 is positioned laterally inward of trailing arm 40 and is parallel to or angled 1-45° relative to centerline L. Alternatively, suspension member may be angled −45-1° relative to centerline L in that suspension member 100 may be positioned laterally outward of trailing arm 40.

As shown in FIG. 6A, a forward extent of suspension member 100 may extend along a plane 93 which, illustratively, is approximately parallel to a plane 95 extending through a forward extent of trailing arm 40. In this way, the forward extents of trailing arm 40 and suspension member 100 may be approximately parallel even when the longitudinal extent of suspension member 100 is angled relative to trailing arm 40. Referring still to FIG. 6A, the forward extent of suspension member 100 may be positioned along plane 93 at a position laterally inward or laterally outward of plane 95 of trailing arm 40. The lateral offset (either inboard or outward) between planes 93, 95 allows for tuning the toe of rear ground-engaging member 14. In this way, rear suspension assembly 26 is configured to allow for tuneability of toe control by calibrating the lateral offset between the forward extents of trailing arm 40 and suspension member 100.

Illustratively, because suspension member 100 may be angled relative to centerline L, first coupling member 102 may be positioned laterally inward of second coupling member 104. As shown best in FIG. 6A, first coupling member 102 may be positioned approximately laterally adjacent forward portions 70a, 72a of first and second suspension members 70, 72 of trailing arm 40, however, first coupling member 102 may be positioned longitudinally rearward of portions 70a, 72a. In this way, the forward portion of suspension member 100, including first coupling member 102, is positioned laterally inboard but rearward of the forward extent of trailing arms 40. For example, as shown in FIG. 6A, a horizontal line or plane P extending through forward portions 70a, 72a of trailing arms 40 is forward of first coupling member 102 and the forward extent of suspension member 100. Alternatively, first coupling member 102 of suspension member 100 may extend forwardly to a position which is approximately the same as the forward extent of trailing arm 40.

Referring to FIGS. 4-8, first coupling member 102 may be configured to pivotally or operably couple a forward portion of suspension member 100 to frame assembly 20 and second coupling member 104 may be configured to pivotally or operably couple a rearward portion of suspension member 100 to knuckle 52 and/or another component of rear ground-engaging member 14. More particularly, second coupling member 104 is operably coupled to knuckle 52 or other component of rear ground-engaging member 14 at a position longitudinally forward of rear axles 56. Illustratively, second coupling member 104 of suspension member 100 is directly and operably coupled to knuckle 52 at a positioned vertically intermediate rearward portions 70b, 72b of respective first and second suspension members 70, 72 defining trailing arms 40. In this way, suspension member 100 is configured to pivot vertically and with trailing arms 40 to control toe of rear ground-engaging members 14.

From FIG. 6A, it is also apparent that second coupling member 104 is positioned laterally outward of a portion of trailing arm 40 and, more particularly, is positioned laterally outward of an inward-most surface 96 of second coupler 60 of trailing arm 40. Therefore, at least inward-most surface 96 of trailing arm 40 is positioned laterally inward of a line 98 extending between couplers 102, 104 of suspension member 100. In this way, suspension member 100 at least partially intersects or extends through a portion of trailing arm 40 such that the longitudinal extents of trailing arm 40 and suspension member 100 overlap each other at a position generally adjacent second coupling member 104 of suspension member 100 and rearward portions 70b, 72b of trailing arm 40. This overlap or intersection of trailing arm 40 and suspension member 100 occurs at a location forward of rear axle 56 and forward of a ball joint positioned at 118 of rear ground-engaging member 14. Additionally, FIG. 6A discloses that second coupling member 104 of suspension member 100 is positioned laterally inward of a steering axis S of knuckle 52.

With this configuration of suspension member 100 and trailing arms 40, the movement of trailing arms 40 and suspension member 100 does not interfere with each other. Additionally, because suspension member 100 is positioned forward of rear axles 56, rear axles 56 do not interfere with the movement of suspension member 100. In this way, suspension member 100 controls toe of rear ground-engaging member 14 throughout suspension travel and is configured to maintain the toe change at approximately zero when rear suspension assembly 26 is in the full compression position. And, the longitudinal configuration of suspension member 100 allows for such toe control without interference from other components of rear suspension assembly 26, rear axles 56, or any other component.

Figure 9:
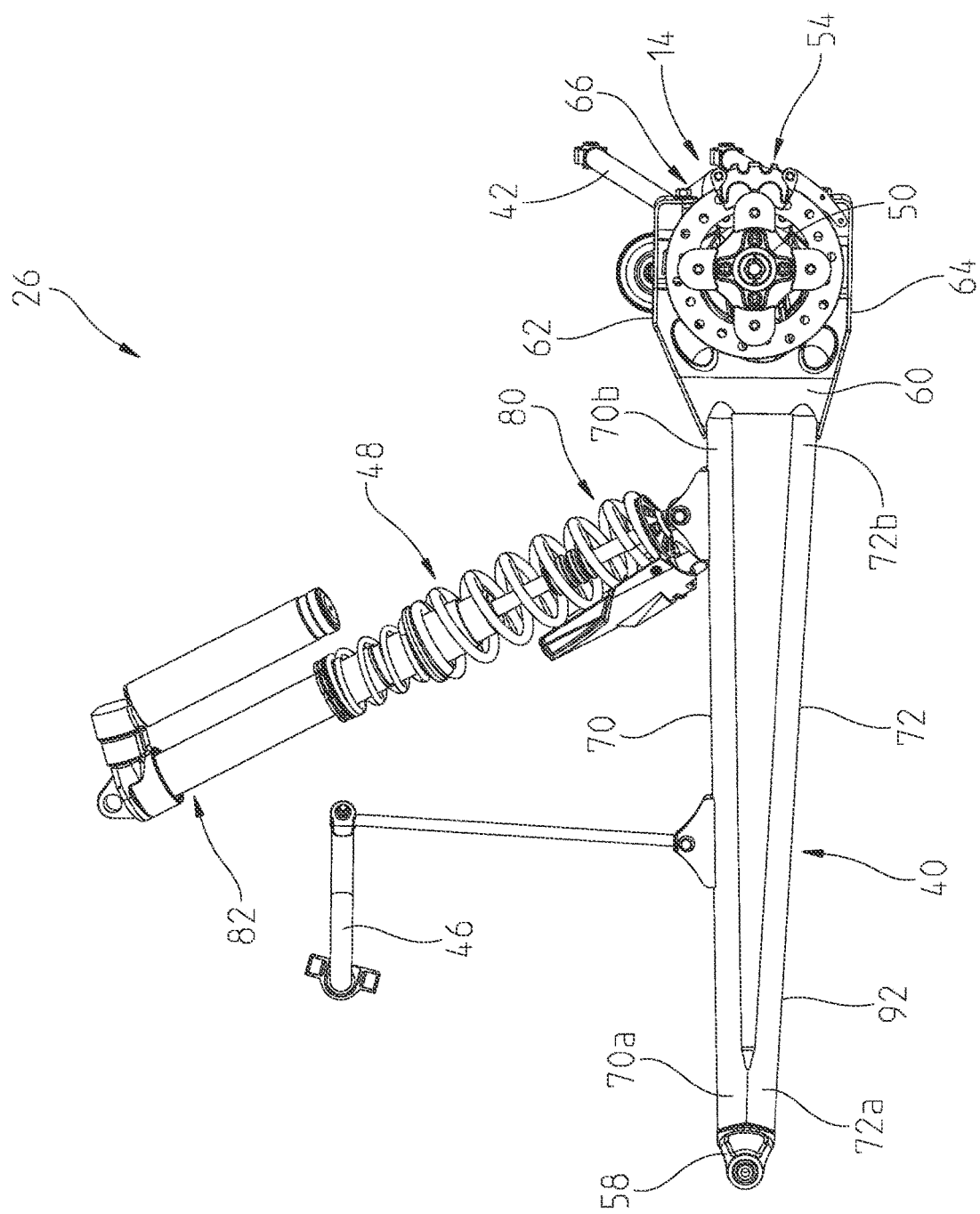
FIG. 9 is a side view of the rear suspension assembly of FIG. 2.
Figure 10:
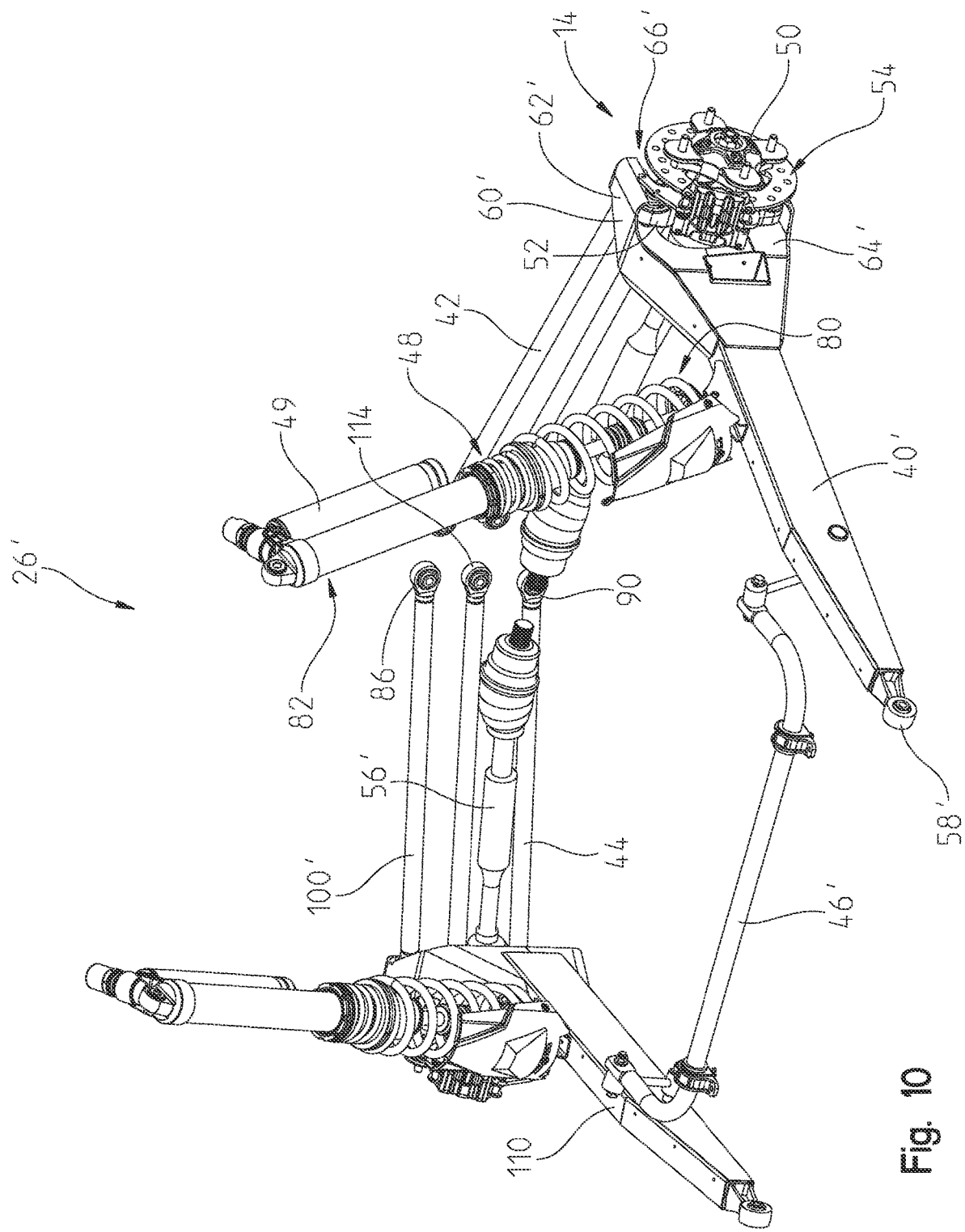
FIG. 10 is a front left perspective view of a rear suspension assembly of the vehicle of FIG. 1 having a lateral suspension member configured to control toe of the rear ground-engaging member.
Figure 11:
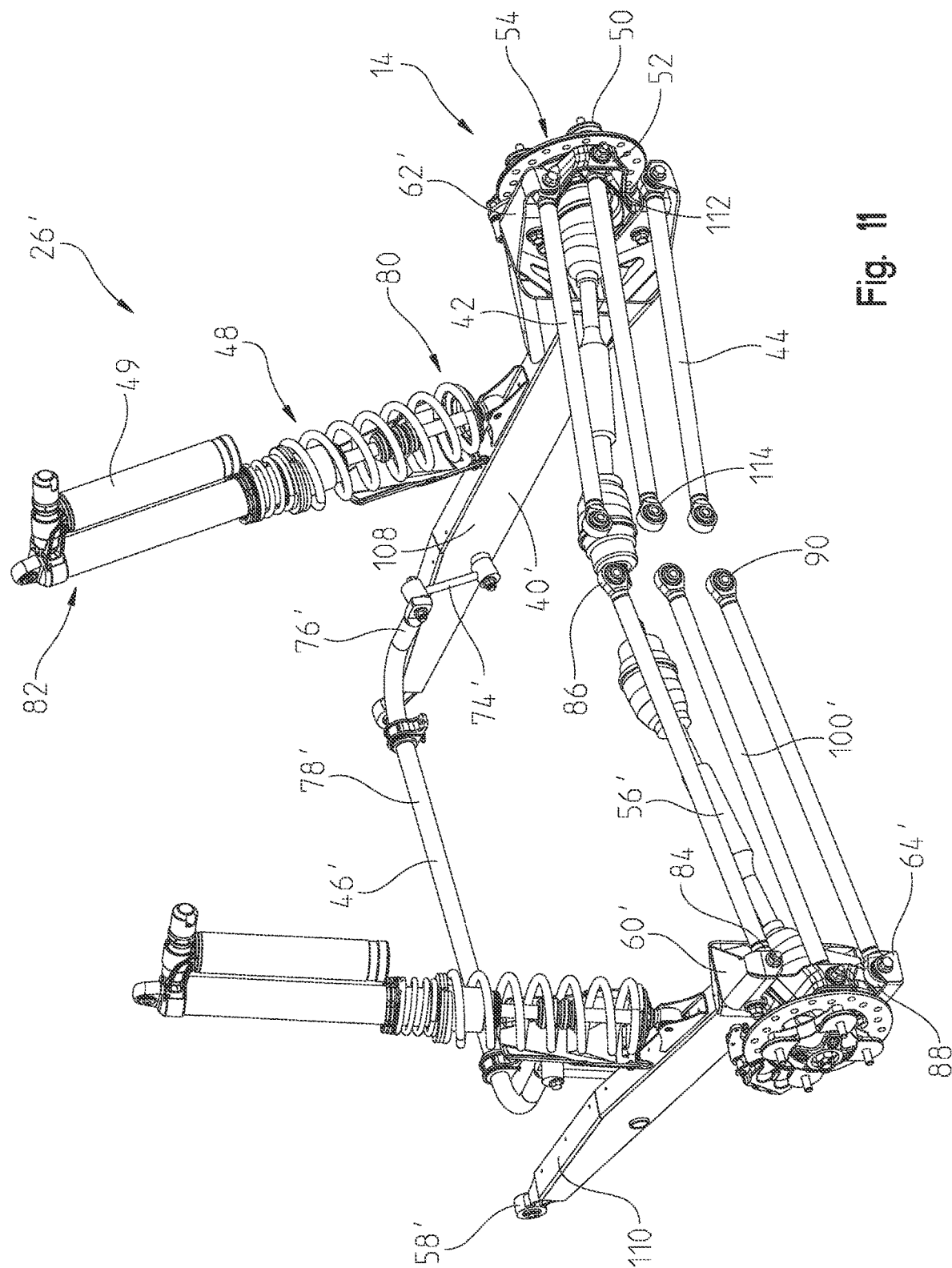
FIG. 11 is a rear left perspective view of the rear suspension assembly of FIG. 10.
Figure 12:
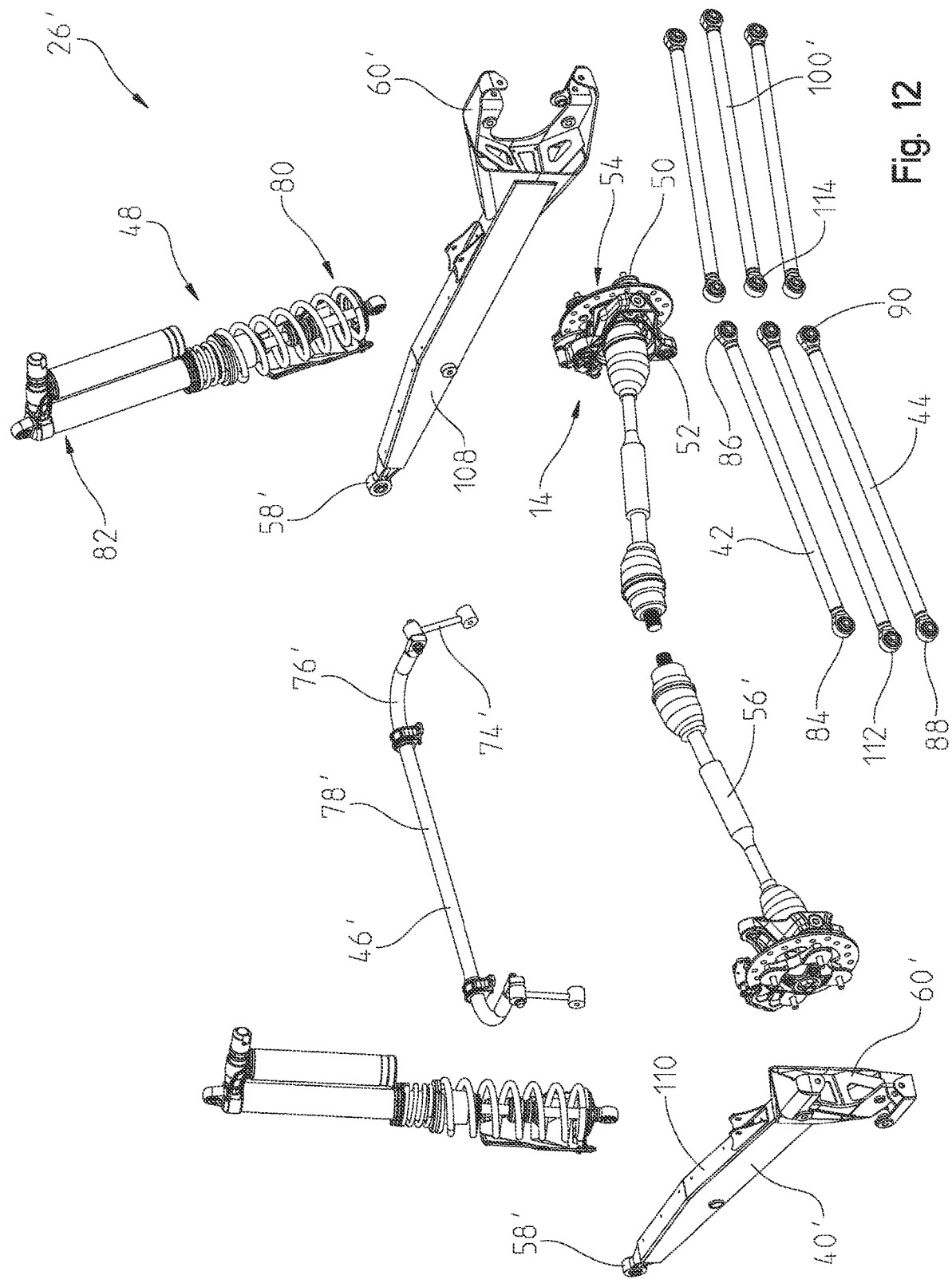
FIG. 12 is a rear exploded view of the rear suspension assembly of FIG. 10.

As shown in FIG. 9, suspension member 100 is entirely positioned within an envelope 92 defined by trailing arm 40 when viewed from the side. Envelope 92 is defined as extending longitudinally between forward portions 70a, 72a and rearward portions 70b, 72b and also extending vertically between first and second suspension members 70, 72 of trailing arm 40. In this way, from the side view of FIG. 9, suspension member 100 is entirely concealed by or at least within envelope 92 of trailing arm 40 such that no portion of suspension member 100 extends above an upper surface of trailing arm 40, extends below a lower surface of trailing arm 40, extends forwardly of a forward extent of trailing arm 40, or extends rearwardly of a rearward extent of trailing arm 40. Therefore, trailing arm 40 protects suspension member 100 from damage by external debris because suspension member 100 does not extend below trailing arm 40, where it could be exposed to rocks or other items on the ground surface, and is positioned laterally inward of trailing arm 40 such that any item or debris outward of trailing arm 40 does not contact suspension member 100.

Furthermore, as shown in FIG. 8, suspension member 100 is entirely positioned within an envelope 94 defined by radius rods 42, 44. Envelope 94 is defined as extending laterally between coupling members 84 and 86, extending laterally between coupling members 88 and 90, extending vertically between coupling members 84 and 88, and extending vertically between coupling members 86 and 90. In this way, from the rear view of FIG. 8, suspension member 100 does not extend above upper radius rod 42, extend below lower radius rod 44, extend laterally inward of coupling members 86, 90, or extend laterally outward of coupling members 84, 88. As is also shown in FIG. 8, first coupling member 102 of suspension member 100 is positioned at least partially above a wheel center W extending through rear ground-engaging member 14 while second coupling member 104 is positioned at least partially below wheel center W when vehicle 10 is in a neutral position on the ground surface. Wheel center W is perpendicular to steering axis S (FIG. 6A).

Additionally, and referring to FIG. 6A, first coupling member 102 of suspension member 100 is positioned laterally inward of a pivot line 97 extending through the forward pivot point of forward portion 70a, 72a of trailing arm 40 and a pivot point of an inner CV joint 57 of rear axle 56. Illustratively, second coupling member 104 of suspension member 100 is positioned laterally outward of pivot line 97. As such, from the top view of FIG. 6A, it is apparent that pivot line 97 intersects suspension member 100. Also, as shown best in FIG. 8, at least first coupling member 102 of suspension member 100 is positioned vertically below pivot line 97 when viewed from the rear.

As is also shown in FIG. 6A, suspension member 100 is positioned relative to a line 116 extending between forward portion 70a, 72a of trailing arm 40 and ball joint of rear ground-engaging member 14 generally positioned at 118. More particularly, suspension member 100 may extend generally parallel to line 116 or may be angled relative to line 116. Illustratively, suspension member 100 extends substantially parallel to line 116. Additionally, suspension member 100 is positioned laterally inward of line 116.

With this configuration of rear suspension assembly 26, suspension member 100 may be provided on vehicle 10 to control toe of rear ground-engaging member 14 without interfering with the movement of other components of rear suspension assembly 26, such as trailing arm 40 and radius rods 42, 44 or rear axles 56.

It is further apparent from FIG. 6A that rear suspension assembly 26 does not interfere with any portion of powertrain assembly 16 and, instead, generally surrounds at least a portion of powertrain assembly 16. Illustratively, trailing arms 40 and suspension member 100 extends to a position forward of a portion of powertrain assembly 16. For example, suspension member 100 extends to a position forward of rear final drive member 120, shiftable transmission 122, engine 124, and CVT 126. More particularly, first coupling member 102 of suspension member 100 and forward portions 70a, 72a of trailing arm 40 are positioned entirely forward of CVT 126 and engine 124. Additionally, at least transmission 122, engine 124, and CVT 126 are positioned laterally intermediate suspension members 100. Illustratively, as shown in FIG. 6A, CVT 126 may be oriented laterally and positioned forward of engine 124, and in such a configuration, CVT 126 is positioned entirely within the lateral and longitudinal extent of suspension members 100. Similarly, as shown in FIG. 6B, when CVT 126 is oriented longitudinally and positioned laterally outward of engine 124, CVT 126 is still positioned entirely with the lateral and longitudinal extent of suspension members 100.

Referring to FIGS. 10-16, a rear suspension assembly 26' for vehicle 10 (FIG. 1) is shown. It may be appreciated that like reference numbers identifying like components of rear suspension assembly 26 of FIGS. 2-9 and rear suspension assembly 26' of FIGS. 10-16 may be used. Rear suspension assembly 26' is a trailing arm-type suspension generally comprised of trailing arms 40', upper radius rods 42, lower radius rods 44, a torsion or sway bar 46', and shock absorbers 48. Illustratively, both a right and left side of vehicle 10 includes trailing arm 40', radius rods 42, 44, and shock absorbers 48 such that both right and left rear ground-engaging members 14 are each operably coupled to one trailing arm 40', upper and lower radius rods 42, 44, and one shock absorber 48. More particularly, at least trailing arms 40' and radius rods 42, 44 are operably coupled to knuckle 52.

Additionally, each of rear ground-engaging members 14 includes rear axle 56' extending between the rear drive member 120 (FIG. 6A) and knuckle 52. Rear axles 56' are configured to rotate rear ground-engaging members 14 during operation of vehicle 10. As shown best in FIG. 13, rear axles 56' extend laterally and may be generally perpendicular to centerline L of vehicle 10.

Referring again to FIGS. 10-16, trailing arms 40' include a first coupler 58' positioned at a forward portion thereof and a second coupler 60' positioned at a rearward portion thereof. First coupler 58' is configured to operably couple trailing arms 40' to frame assembly 20 (FIG. 1) and second coupler 60' is configured to operably couple trailing arms 40' to rear ground-engaging member 14, illustratively to knuckle 52. First coupler 58' is configured to allow trailing arms 40' to pivot or rotate in a generally vertically direction relative to frame assembly 20. Second coupler 60' includes an upper portion 62', a lower portion 64', and a recessed portion 66' positioned therebetween. Illustratively, recessed portion 66' is configured to receive a portion of knuckle 52 and second coupler 60' may be coupled to knuckle 52 or any other portion of rear ground-engaging member 14.

In one embodiment, trailing arms 40' are configured to extend in a generally longitudinal or forward-aft direction between first and second couplers 58', 60'. More particularly, trailing arms 40' extend generally longitudinally because trailing arms 40' may be generally parallel to centerline L of vehicle 10 and/or may have a longitudinal directional component angled less than 45° relative to centerline L. Through couplers 58', 60', trailing arms 40' are configured to pivot generally vertically during operation of vehicle 10, especially as vehicle 10 traverses various terrain.

Referring still to FIGS. 10-16, torsion bar 46' may be operably coupled to an inner surface 108 of trailing arm 40' through link arms 74'. Link arms 74' may extend in a generally vertical direction between inner surface 108 of trailing arm 40' and a rearward portion 76' of torsion bar 46'. Illustrative torsion bar 46' includes a forward portion 78' positioned forward of and coupled to rearward portions 76' such that torsion bar 46' generally defines a curved or U-shaped configuration. Both forward portion 78' and rearward portions 76' are at a vertically higher or greater position on vehicle 10 than trailing arms 40'. However, because link arms 74' are operably coupled to inner surface 108 of trailing arm 40, torsion bar 46' is positioned laterally intermediate trailing arms 40' and is not positioned directly vertically above a portion of trailing arms 40'. Through link arms 74', torsion bar 46' is configured to move relative to trailing arms 40'.

As shown in FIGS. 10-16, shock absorbers 48 also may be operably coupled to trailing arm 40'. Illustratively, lower end portion 80 of shock absorbers 48 is coupled to an upper surface 110 of trailing arm 40' and upper end portion 82 of shock absorbers 48 is coupled to a portion of frame assembly 20 (FIG. 1). Upper end portion 82 is angled forwardly relative to lower end portion 80, as shown best in FIG. 16. Additionally, and as shown best in FIGS. 13-15, upper end portion 82 may be angled inwardly in a lateral direction relative to lower end portion 80. In one embodiment, shock absorber 48 may be a gas-assist shock having gas canister 49.

As is also shown in FIGS. 10-16, radius rods 42, 44 may be operably coupled with trailing arm 40' through second coupler 60'. More particularly, upper radius rod 42 is pivotably coupled to upper portion 62' of second coupler 60' at first coupling member 84 and is pivotably coupled to a portion (not shown) of frame assembly 20 at second coupling member 86. Additionally, lower radius rod 44 is pivotably coupled to lower portion 64' of second coupler 60' at first coupling member 88 and is pivotably coupled to a portion (not shown) of frame assembly 20 at second coupling member 90. In one embodiment, radius rods 42, 44 may extend approximately 90° relative to second coupler 60'.

During operation of vehicle 10, rear suspension assembly 26' is configured to move relative to frame assembly 20 (FIG. 1) between full extension and full compression positions. When rear suspension assembly 26' is at the full compression position, for example, vehicle 10 may operate best when rear ground-engaging members 14 are positioned forward and are not angled relative to centerline L (FIG. 1) such that the toe change of rear ground-engaging member 14 is approximately zero. In other words, vehicle 10 may operate best in various positions of rear suspension assembly 26' when rear ground-engaging members 14 do not toe in or toe out, especially, for example, at full compression.

In order to maintain the position or toe of rear ground-engaging members 14 in a forward-facing direction during suspension travel, and especially when rear suspension assembly 26' is in the full compression position, rear suspension assembly 26' includes a suspension member 100' configured to control toe of rear ground-engaging members 14. In this way, suspension member 100' may be defined as a toe link or toe control member of rear suspension assembly 26'. In one embodiment, suspension member 100' is positioned rearwardly of trailing arms 40', rear axles 56', torsion bar 46', and shock absorbers 48. By positioning suspension member 100' at a position rearward of at least rear axles 56', rear axles 56' does not interfere with the movement of suspension member 100'.

Each of suspension members 100' includes a first or outer coupling member 112 pivotally coupled to knuckle 52 of rear ground-engaging member 14 and a second or inner coupling member 114 pivotally coupled to a portion (not shown) of frame assembly 20 (FIG. 1). In this way, suspension member 100' is configured to pivot in a generally vertical direction and may be configured to pivot upwardly and/or downwardly with radius rods 42, 44.

Figure 13:
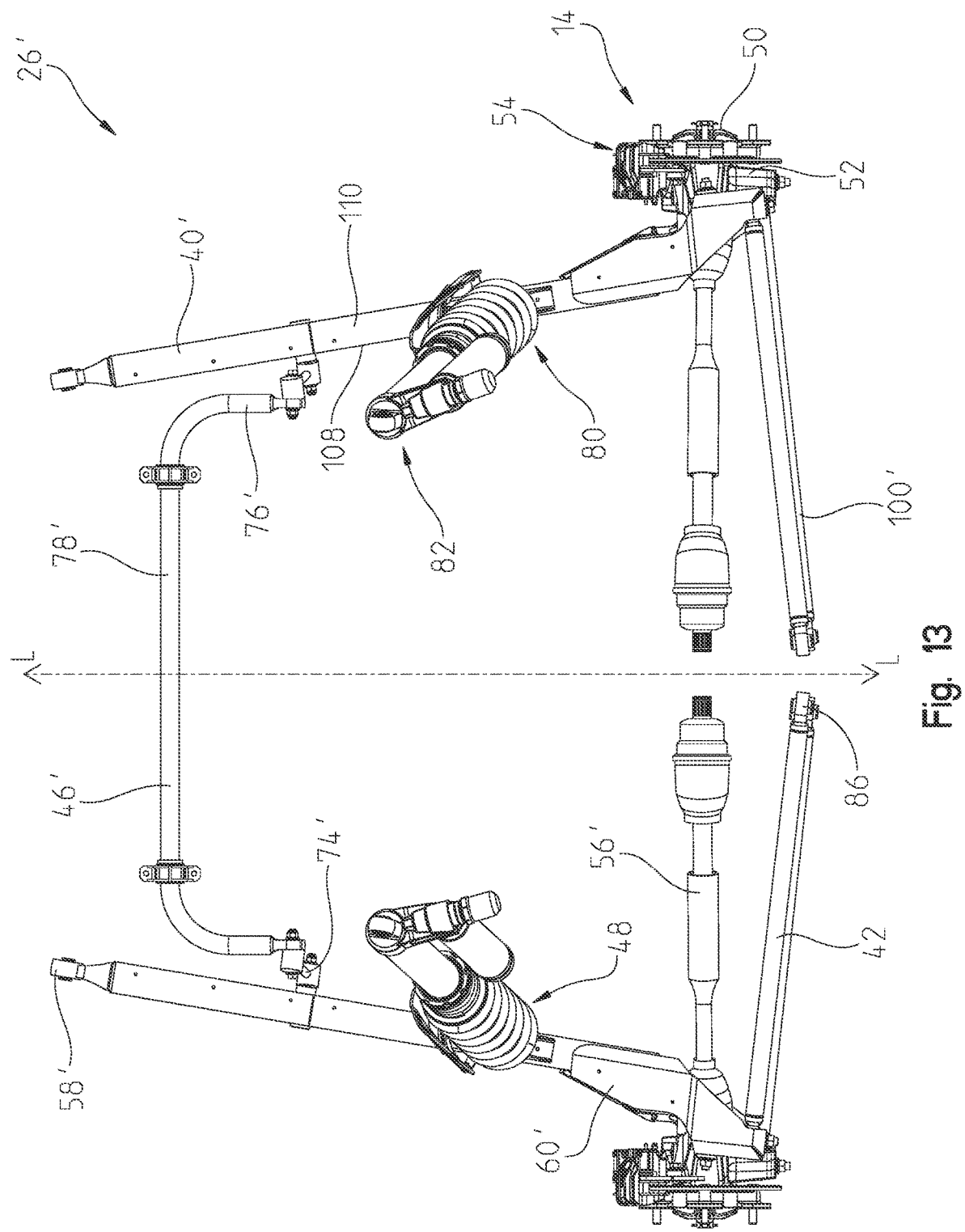
FIG. 13 is a top view of the rear suspension assembly of FIG. 10.
Figure 14:
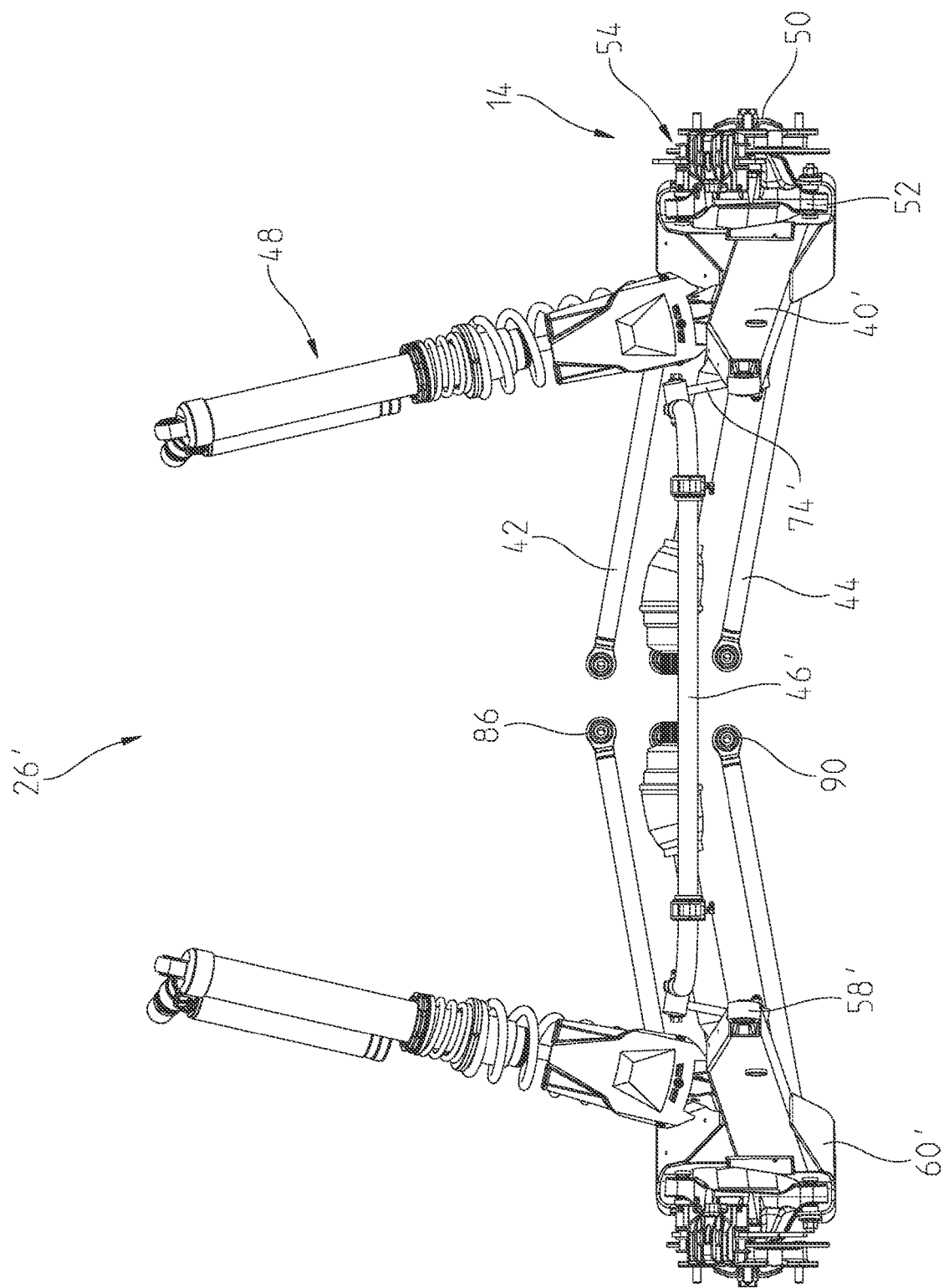
FIG. 14 is a front view of the rear suspension assembly of FIG. 10.
Figure 15:
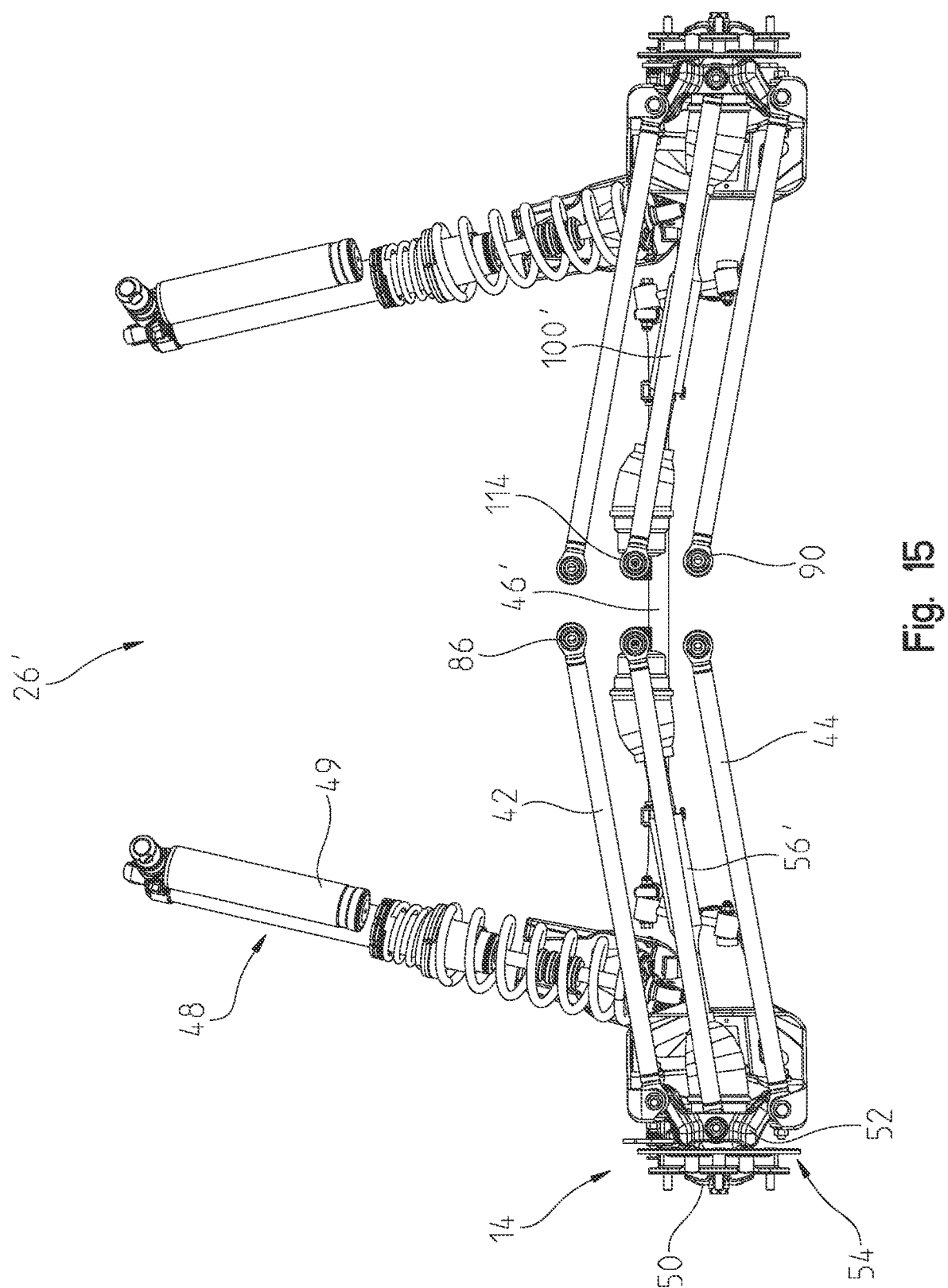
FIG. 15 is a rear view of the rear suspension assembly of FIG. 10.
Figure 16:
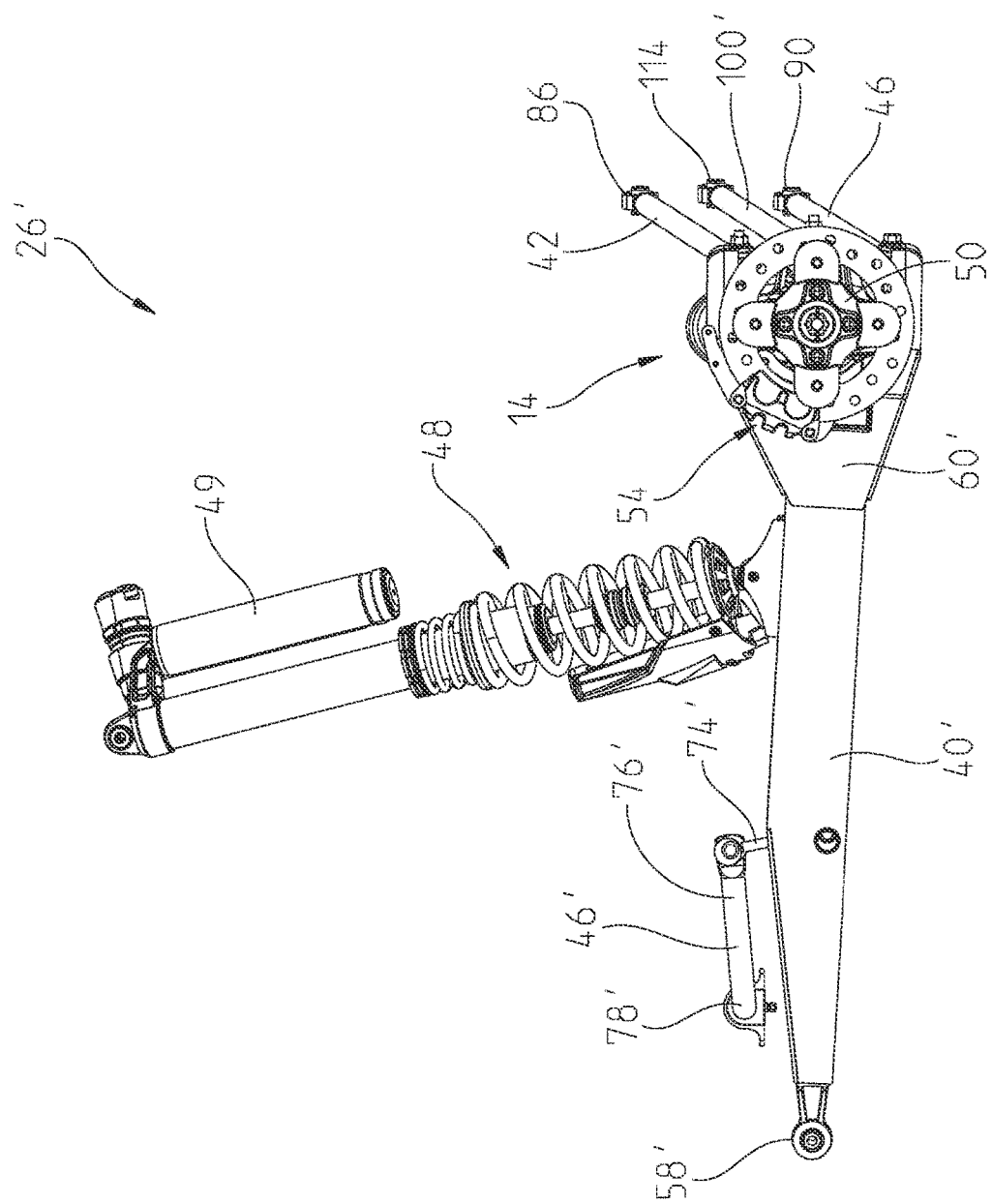
FIG. 16 is a side view of the rear suspension assembly of FIG. 10.
Figure 17:
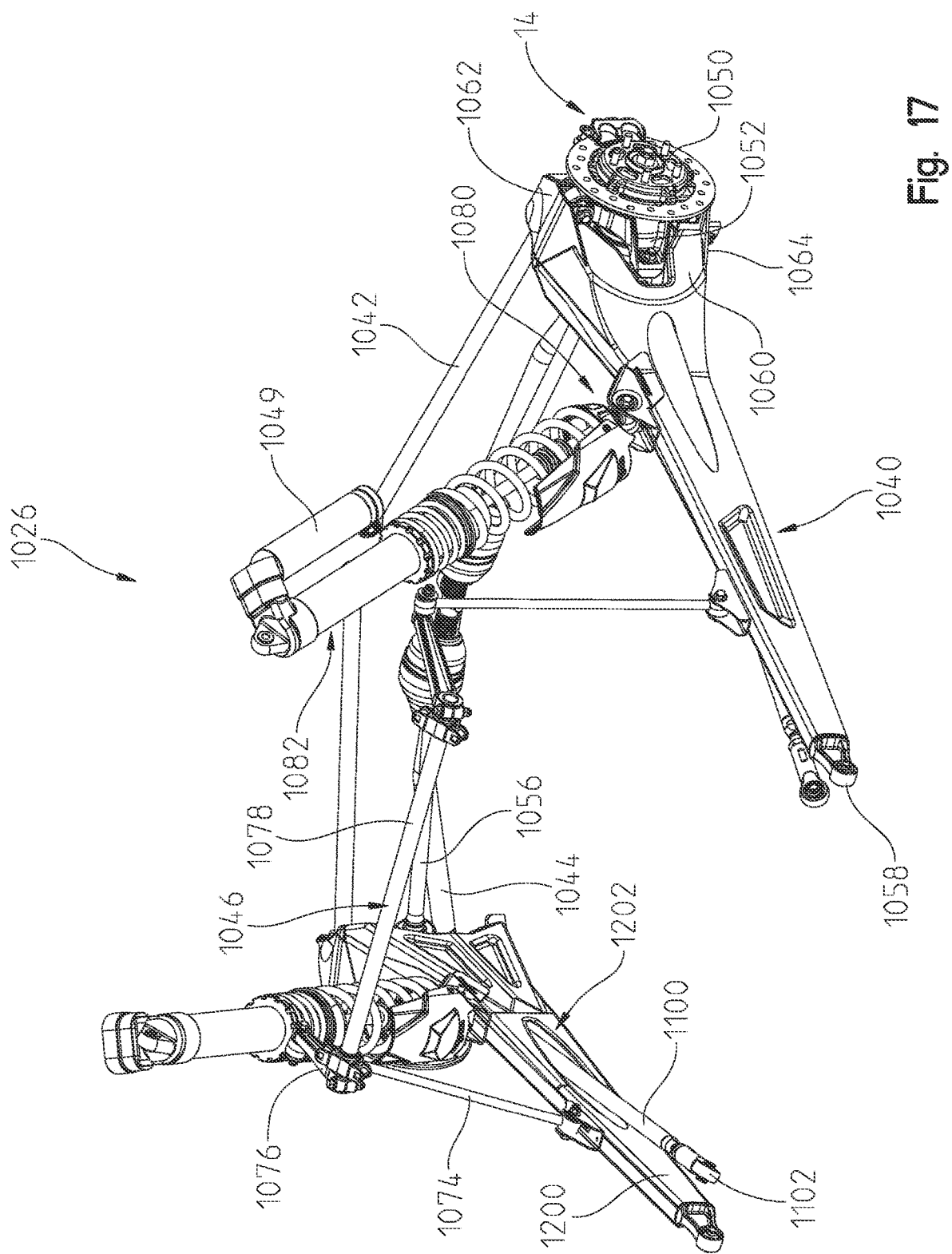
FIG. 17 is a front left perspective view of an alternative embodiment rear suspension assembly of the vehicle of FIG. 1.
Figure 18:
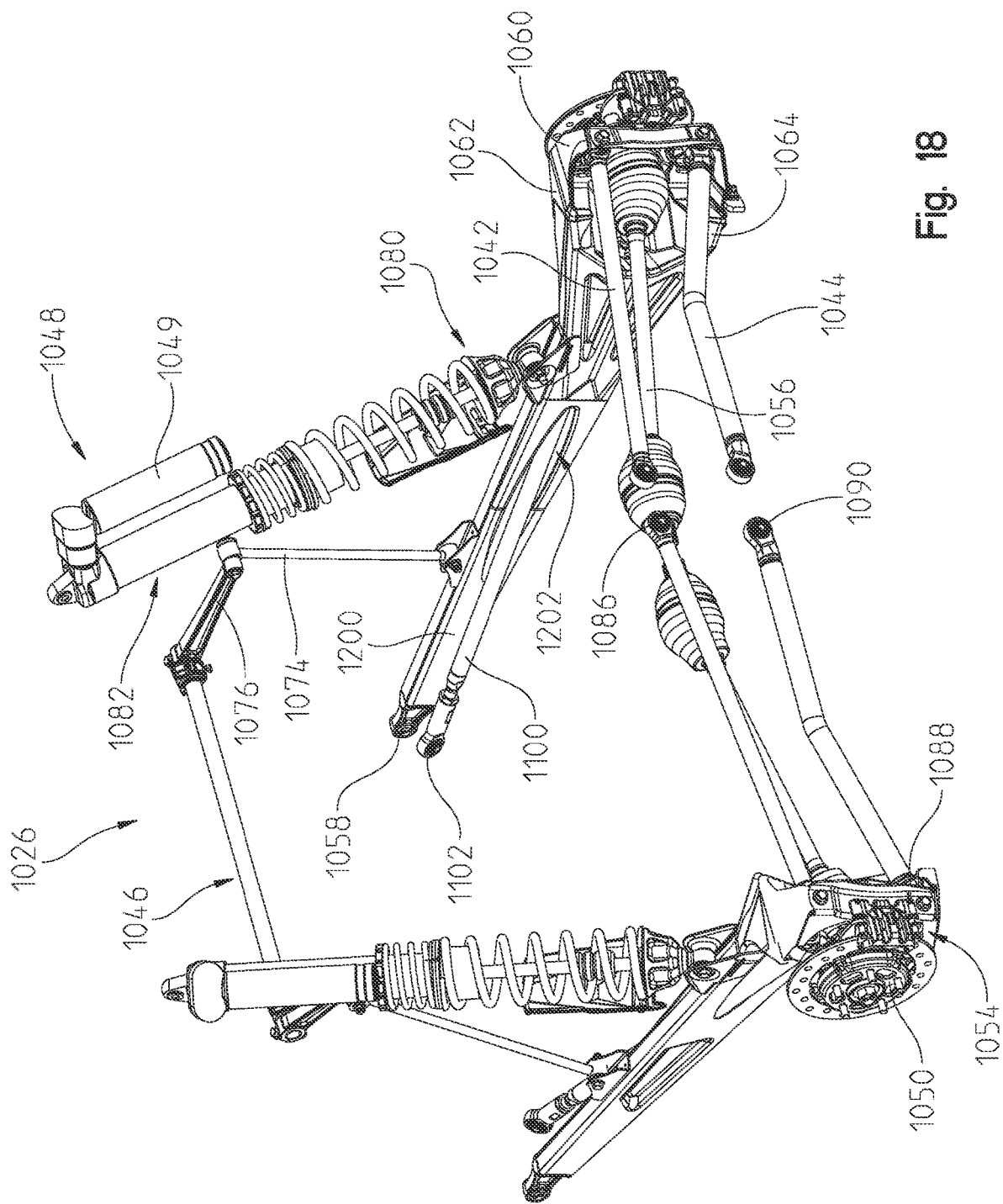
FIG. 18 is a rear left perspective view of the rear suspension assembly of FIG. 17.

Illustratively, suspension members 100' are positioned vertically intermediate radius rods 42, 44 such that suspension member 100' is positioned vertically lower than upper radius rod 42 and vertically above lower radius rod 44. In this way, suspension member 100' also may extend in a general lateral direction. In other words, suspension members 100' have a laterally-extending component relative to centerline L which is angled 45° or less relative to the true lateral direction. In this way, suspension members 100' may be swept rearwardly such that second coupling member 114 is positioned rearwardly relative to first coupling member 112. Additionally, and as shown in FIGS. 14 and 15, suspension member 100' is angled relative to a vertical axis (not shown) extending perpendicularly to centerline L (FIG. 13). In this way, suspension member 100' may be angled upwardly such that second coupling member 114 is positioned at a higher or greater vertical position on vehicle 10 relative to first coupling member 112.

In operation, as vehicle 10 traverses various terrain, rear suspension assembly 26' and rear ground-engaging members 14 are configured to move relative to frame assembly 20 (FIG. 1). However, when rear suspension assembly 26' is at the full compression position in that vehicle 10 has the least amount of ground clearance relative to the ground surface, rear suspension assembly 26' is configured to control toe of rear ground-engaging members 14 such that rear ground-engaging members 14 are in a forward-facing direction and do not toe in or toe out relative to centerline L. More particularly, suspension members 100' are configured to control toe of rear ground-engaging members 14.

Referring to FIGS. 17-26, an alternative embodiment of rear suspension assembly 26 is shown as rear suspension assembly 1026. It may be appreciated that like reference numbers identifying like components of rear suspension assembly 26 of FIGS. 2-9 and rear suspension assembly 1026 of FIGS. 17-26 may be used. Rear suspension assembly 1026 is a trailing arm-type suspension generally comprised of trailing arms 1040, upper radius rods 1042, lower radius rods 1044, a torsion or sway bar 1046, and shock absorbers 1048. At least trailing arms 1040 and radius rods 1042, 1044 are operably coupled to a knuckle 1052 of each rear ground-engaging member 14.

Additionally, each of rear ground-engaging members 14 includes a rear axle or half shaft 1056 extending between rear final drive member 120 (FIG. 24) and knuckle 1052. Rear axles 1056 are configured to rotate rear ground-engaging members 14 during operation of vehicle 10. As shown best in FIG. 24, rear axles 1056 extend laterally and may be generally perpendicular to centerline L of vehicle 10.

Referring again to FIGS. 17-26, trailing arms 1040 include a first coupler 1058 positioned at a forward portion thereof and a second coupler 1060 positioned at a rearward portion thereof. First coupler 1058 is configured to operably couple trailing arms 1040 to frame assembly 20 (FIG. 1) and second coupler 1060 is configured to operably couple trailing arms 1040 to rear ground-engaging member 14. First coupler 1058 is configured to allow trailing arms 1040 to pivot or rotate in a generally vertically direction relative to frame assembly 20. Second coupler 1060 includes an upper portion 1062, a lower portion 1064, and a recessed portion 1066 (FIG. 19) positioned therebetween. Illustratively, recessed portion 1066 is configured to receive a portion of knuckle 1052 and second coupler 1060 may be coupled to any portion of rear ground-engaging member 14. In this way, trailing arm 1040 is operably coupled to knuckle 1052 of rear ground-engaging member 14 through second coupler 1060.

In one embodiment, trailing arms 1040 are configured to extend in a generally longitudinal or forward-aft direction between first and second couplers 1058, 1060. More particularly, trailing arms 1040 extend generally longitudinally because trailing arms 1040 may be generally parallel to centerline L of vehicle 10 and/or may have a longitudinal directional component angled less than 45° relative to centerline L. Through couplers 1058, 1060, trailing arms 1040 are configured to pivot generally vertically during operation of vehicle 10, especially as vehicle 10 traverses various terrain.

Referring still to FIGS. 17-24, torsion or stabilizer bar 1046 of rear suspension assembly 1026 may be operably coupled to trailing arms 1040 through link arms 1074. Link arms 1074 may extend in a generally vertical direction between an upper surface trailing arm 1040 and a rearward portion 1076 of torsion bar 1046. Illustrative torsion bar 1046 includes a forward portion 1078 positioned forward of and coupled to rearward portions 1076 such that torsion bar 1046 generally defines a curved or U-shaped configuration. Both forward portion 1078 and rearward portions 1076 are at a vertically higher or greater position on vehicle 10 than trailing arms 1040 and at least rearward portions 1076 are partially positioned directly above a portion of trailing arms 1040. Through link arms 1074, torsion bar 1046 is configured to move relative to trailing arms 1040.

As shown in FIG. 24, at least forward portion 1078 of torsion bar 1046 is positioned entirely forward of engine 124, shiftable transmission 122, CVT 126, and rear final drive member 120. More particularly, when powertrain assembly 16 includes an embodiment coupling CVT 126 laterally outward of engine 124, at least forward portion 1078 of torsion bar 1046 is positioned entirely forward of CVT 126, engine 124, and transmission 122. Additionally, rearward portions 1076 of torsion bar 1046 may be positioned forward of at least a portion of engine 124 and CVT 126 and positioned entirely forward of transmission 122. Additional details of powertrain assembly 16 may be disclosed in U.S. patent application Ser. No. 14/577,908, filed Dec. 19, 2014 and U.S. patent application Ser. No. 14/434,685, filed Apr. 9, 2015, the complete disclosures of which are expressly incorporated by reference herein.

As shown in FIGS. 17-24, shock absorbers 1048 also may be operably coupled to trailing arm 1040. Illustratively, a lower end portion 1080 of each of shock absorbers 1048 is coupled to the upper surface of trailing arm 1040 and an upper end portion 1082 of each of shock absorbers 1048 is coupled to a portion of frame assembly 20 (FIG. 1). Upper end portion 1082 is angled forwardly relative to lower end portion 1080, as shown best in FIG. 23. Additionally, and as shown best in FIGS. 20-24, upper end portion 1082 may be angled inwardly in a lateral direction relative to lower end portion 1080. In one embodiment, shock absorber 1048 may be a gas-assist shock having a gas canister 1049.

As is also shown in FIGS. 17-24, radius rods 1042, 1044 may be operably coupled with trailing arm 1040 and knuckle 1052 through second coupler 1060. More particularly, upper radius rod 1042 is pivotably coupled to upper portion 1062 of second coupler 1060 at a first coupling member 1084 and is pivotably coupled to a portion (not shown) of frame assembly 20 at a second coupling member 1086. Additionally, lower radius rod 1044 is pivotably coupled to lower portion 1064 of second coupler 1060 at a first coupling member 1088 and is pivotably coupled to a portion (not shown) of frame assembly 20 at a second coupling member 1090. Coupling members 1084, 1088 may be positioned longitudinally rearward of trailing arm 1040.

Figure 20:
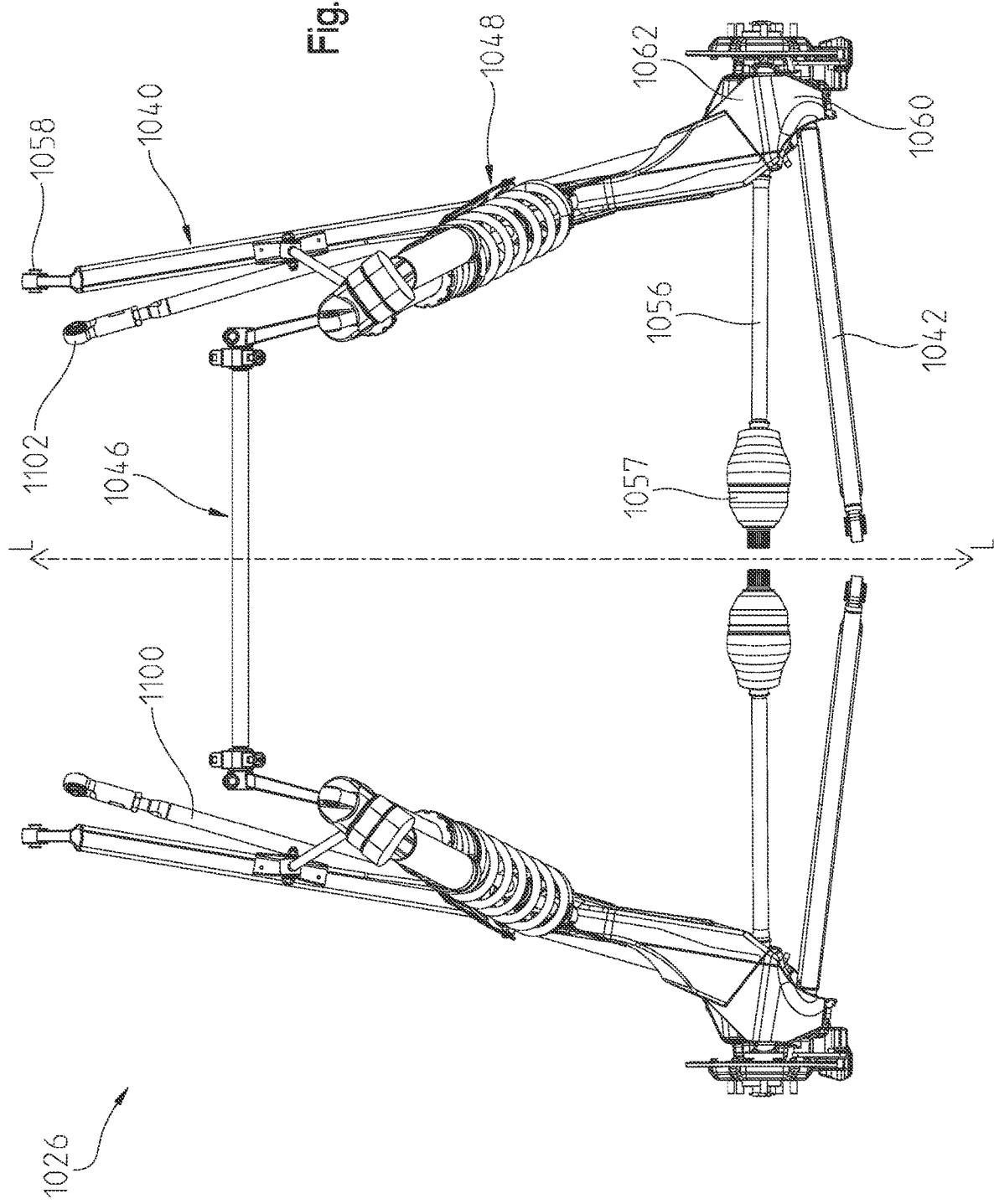
FIG. 20 is a top view of the rear suspension assembly of FIG. 17.
Figure 21:
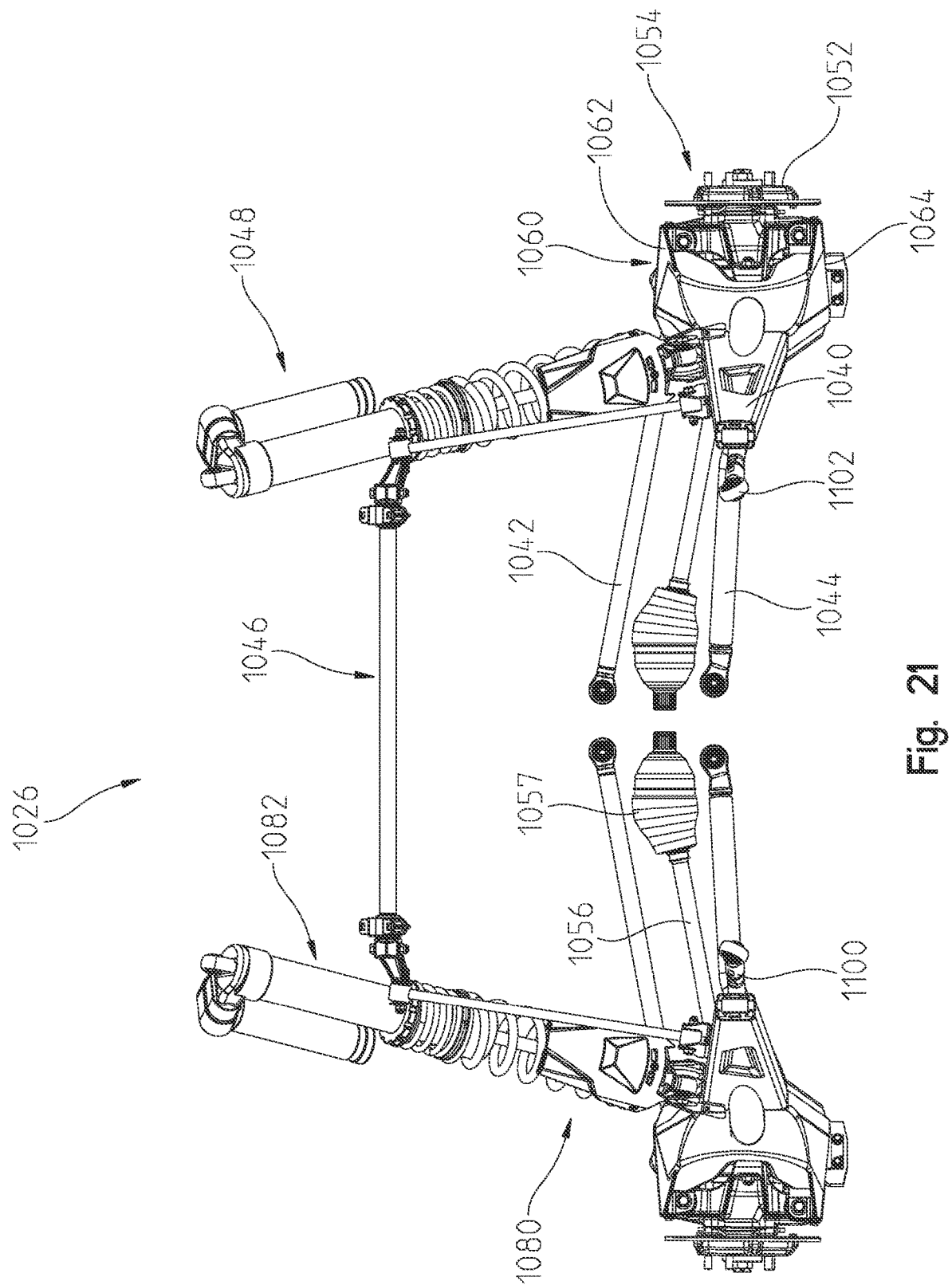
FIG. 21 is a front view of the rear suspension assembly of FIG. 17.
Figure 22:
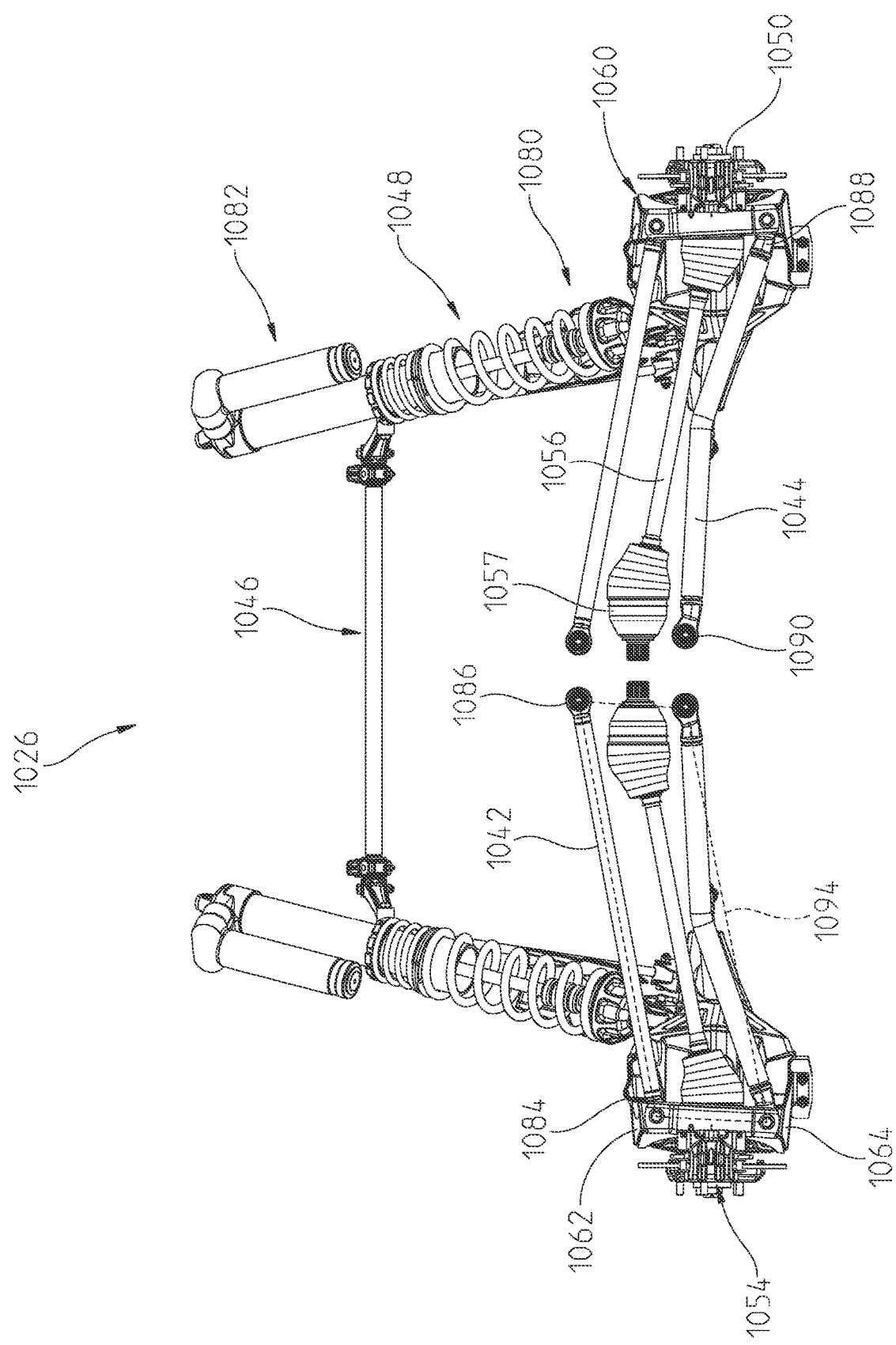
FIG. 22 is a rear view of the rear suspension assembly of FIG. 17.

As shown best in FIG. 20, radius rods 1042, 1044 extend in a general lateral direction. In other words, radius rods 1042, 1044 have a laterally-extending component relative to centerline L. However, in one embodiment, radius rods 1042, 1044 are angled relative to a true lateral direction which would perpendicularly intersect centerline L but are angled less than 45° from the true lateral direction. Illustratively, radius rods 1042, 1044 may be swept rearwardly such that second coupling members 1086, 1090 are positioned rearwardly relative to first coupling members 1084, 1088. Additionally, and as shown in FIGS. 21 and 22, radius rods 1042, 1044 also are angled relative to a vertical axis (not shown) extending perpendicularly to centerline L. In this way, radius rods 1042, 1044 may be angled upwardly such that second coupling members 1086, 1090 are positioned at a higher or greater vertical position on vehicle 10 relative to first coupling members 1084, 1088.

During operation of vehicle 10, rear suspension assembly 1026 is configured to move relative to frame assembly 20 (FIG. 1) between full extension and full compression positions. For example, when rear suspension assembly 1026 is at full compression such that vehicle 10 has the least amount of ground clearance relative to the ground surface, vehicle 10 may operate best when rear ground-engaging members 14 are positioned forward and are not angled inwardly or outwardly relative to centerline L (FIG. 1) such that the toe change of rear ground-engaging member 14 is approximately zero. In other words, vehicle 10 may operate best in various positions of rear suspension assembly 1026 when rear ground-engaging members 14 do not toe in or toe out, especially, for example, at when rear suspension assembly 1026 is at the full compression position.

In order to maintain the position or toe of rear ground-engaging members 14 in a forward-facing direction during suspension travel, and especially when rear suspension assembly 1026 is in the full compression position, rear suspension assembly 1026 includes a suspension member 1100 configured to control toe of rear ground-engaging members 14. In this way, suspension member 1100 may be defined as a toe link or toe control member of rear suspension assembly 1026. In one embodiment, suspension member 1100 is positioned adjacent and laterally inwardly of trailing arms 1040 such that suspension member 1100 is positioned laterally closer to centerline L (FIG. 20) than trailing arms 1040. In one embodiment, suspension member 1100 also is angled relative to trailing arms 1040.

Illustrative suspension member 1100 extends generally longitudinally between a first or forward coupling member 1102 and a second or rearward coupling member 1104. More particularly, suspension member 1100 may be generally parallel to centerline L of vehicle 10 or may have a longitudinal directional component angled 45° or less relative to centerline L. For example, suspension member 1100 may be angled 0-45° relative to centerline L in that suspension member 1100 is positioned laterally inward of trailing arm 1040 and is parallel to or angled 1-45° relative to centerline L. Alternatively, suspension member 1100 may be angled −45 to 1° relative to centerline L in that suspension member 1100 may be positioned laterally outward of trailing arm 1040.

As disclosed herein (with respect to suspension member 100 of FIG. 6A), a forward extent of suspension member 1100 of FIGS. 17-24 may extend along plane 93 (FIG. 6A) which, illustratively, is approximately parallel to plane 95 extending through a forward extent of trailing arm 1040. In this way, the forward extents of trailing arm 1040 and suspension member 1100 may be approximately parallel even when the longitudinal extent of suspension member 1100 is angled relative to trailing arm 1040. The forward extent of suspension member 1100 may be positioned along plane 93 at a position laterally inward or laterally outward of plane 95 of trailing arm 1040. The lateral offset (either inboard or outward) between planes 93, 95 allows for tuning the toe of rear ground-engaging member 14. In this way, rear suspension assembly 1026 is configured to allow for tuneability of toe control by calibrating the lateral offset between the forward extents of trailing arm 1040 and suspension member 1100.

Illustratively, because suspension member 100 may be angled relative to centerline L, first coupling member 1102 may be positioned laterally inward of second coupling member 1104. As shown best in FIG. 20, first coupling member 1102 may be positioned approximately laterally adjacent an inner surface 1200 of trailing arm 1040 and longitudinally rearward of first coupler 1058. In this way, the forward portion of suspension member 1100, including first coupling member 1102, is positioned laterally inboard but rearward of the forward extent of trailing arms 1040.

Figure 19:
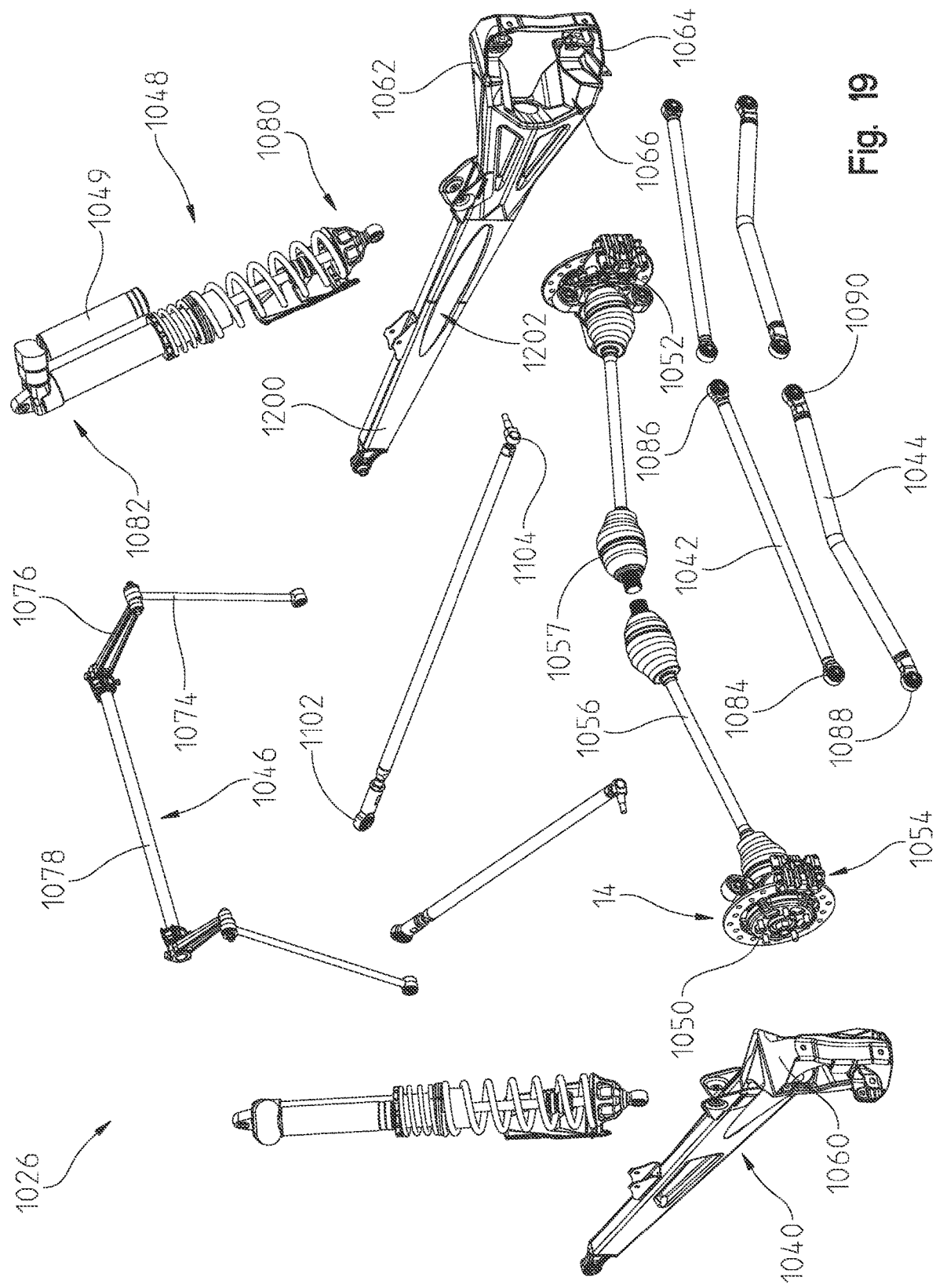
FIG. 19 is a rear exploded view of the rear suspension assembly of FIG. 17.

Referring to FIGS. 19 and 20, first coupling member 1102 may be configured to pivotally or operably couple a forward portion of suspension member 1100 to frame assembly 20 and second coupling member 1104 may be configured to pivotally or operably couple a rearward portion of suspension member 1100 to knuckle 1052 and/or another component of rear ground-engaging member 14. More particularly, second coupling member 1104 is operably coupled to knuckle 1052 or other component of rear ground-engaging member 14 at a position longitudinally forward of rear axles 1056. Illustratively, second coupling member 1104 of suspension member 1100 extends through an opening or aperture 1202 on inner surface 1200 of trailing arm 1040 to couple with knuckle 1052. As such, suspension member 1100 intersects or laterally overlaps a portion of trailing arm 1040 and, therefore, moves with trailing arm 1040 during operation of vehicle 10. This overlap or intersection of trailing arm 1040 and suspension member 1100 occurs at a location forward of rear axle 1056 and forward of ball joint 118 (FIG. 6A) of rear ground-engaging member 14. Additionally, second coupling member 1104 of suspension member 1100 is positioned laterally inward of steering axis S (FIG. 6A) of knuckle 1052. In this way, suspension member 1100 is configured to pivot vertically and with trailing arms 1040 to control toe of rear ground-engaging members 14.

Alternatively, as shown in FIG. 24, suspension member 1100 may be shown as 1100' and extends rearward of rear axles 1056 to couple with a rearward portion of knuckle 1052 or second coupler 1060 through second coupling member 1104'. Illustratively, FIG. 24 discloses that second coupling member 1104' is positioned generally adjacent control arms 1042, 1044. In such an embodiment, suspension member 1100' does not intersect inner surface 1200 of trailing arm 1040 and, instead, extends entirely along inner surface 1200. Suspension member 1100' may extend under rear axle 1056, over rear axle 1056, or may fork both sides of rear axle 1056. With the configuration of suspension member 1100 and trailing arms 1040 shown in FIGS. 20 and 24, trailing arms 1040 and suspension member 1100 do not interfere with each other.

Figure 23:
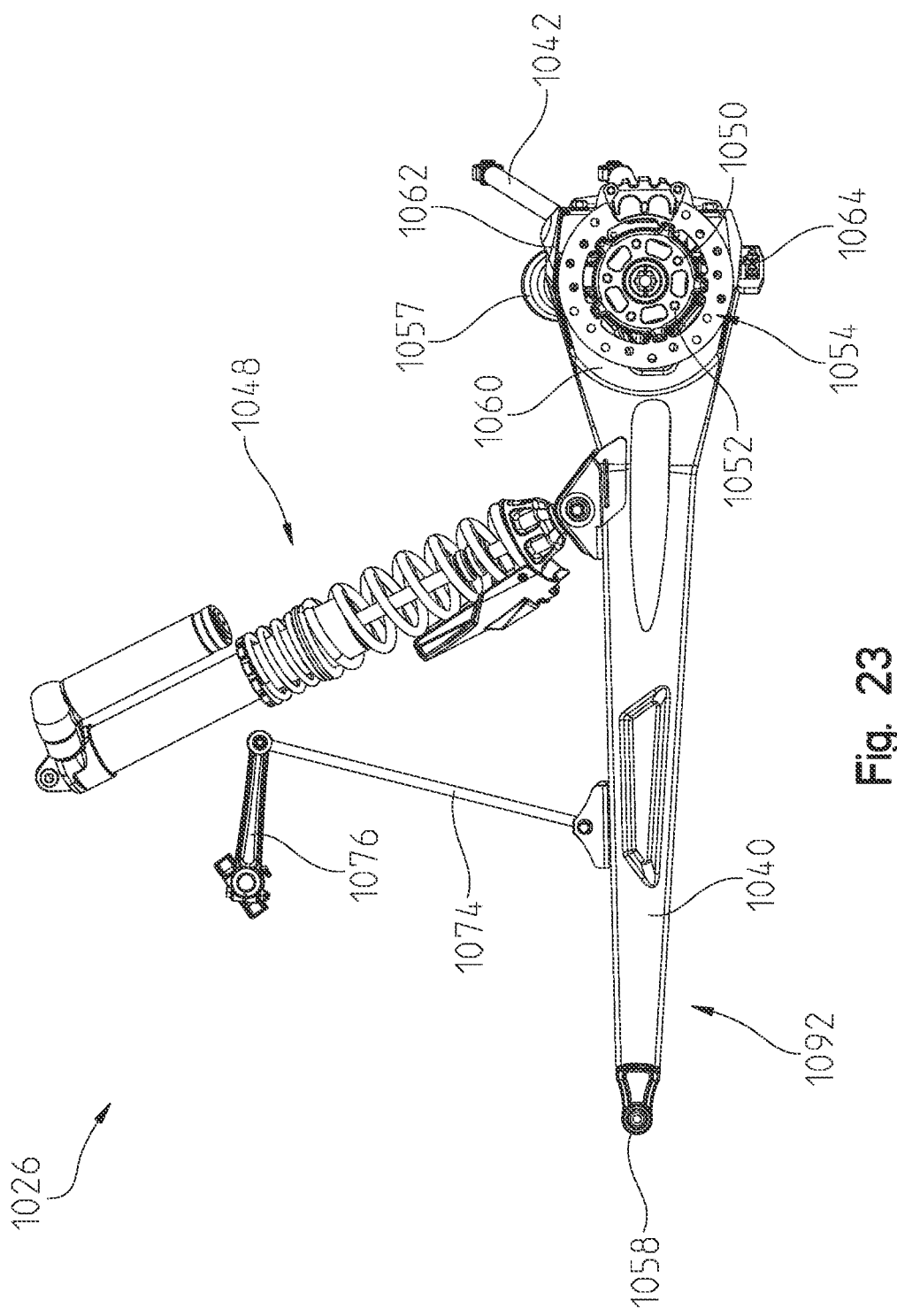
FIG. 23 is a side view of the rear suspension assembly of FIG. 17.

As shown in FIG. 23, suspension member 1100 is entirely positioned within an envelope 1092 defined by trailing arm 1040 when viewed from the side. Envelope 1092 is defined as extending longitudinally between first and second couplers 1058, 1060 and also extending vertically between upper and lower surfaces of trailing arm 1040. In this way, from the side view of FIG. 23, suspension member 1100 is entirely concealed by or at least within envelope 1092 of trailing arm 1040 such that no portion of suspension member 1100 extends above an upper surface of trailing arm 1040, extends below a lower surface of trailing arm 1040, extends forwardly of a forward extent of trailing arm 1040, or extends rearwardly of a rearward extent of trailing arm 1040. Therefore, trailing arm 1040 protects suspension member 1100 from damage by external debris because suspension member 1100 does not extend below trailing arm 1040, where it could be exposed to rocks or other items on the ground surface, and is positioned laterally inward of trailing arm 1040 such that any item or debris outward of trailing arm 1040 does not contact suspension member 1100.

Furthermore, as shown in FIG. 22, suspension member 1100 is entirely positioned within an envelope 1094 defined by radius rods 1042, 1044. Envelope 1094 is defined as extending laterally between coupling members 1084 and 1086, extending laterally between coupling members 1088 and 1090, extending vertically between coupling members 1084 and 1088, and extending vertically between coupling members 1086 and 1090. In this way, from the rear view of FIG. 22, suspension member 1100 does not extend above upper radius rod 1042 and extends to a position generally coplanar with or above lower radius rod 1044. Additionally, suspension member 1100 does not extend laterally inward of coupling members 1086, 1090 or laterally outward of coupling members 1084, 1088. As disclosed herein, first coupling member 1102 of suspension member 1100 is positioned at least partially above wheel center W (FIG. 8) extending through rear ground-engaging member 14 while second coupling member 1104 is positioned at least partially below wheel center W when vehicle 10 is in a neutral position on the ground surface. Wheel center W is perpendicular to steering axis S (FIG. 6A).

Additionally, the present disclosure shows that first coupling member 1102 of suspension member 1100 is positioned laterally inward of pivot line 97 (FIG. 6A) extending through the forward pivot point of trailing arm 1040 and the pivot point of inner CV joint 1057 of rear axle 1056. Illustratively, second coupling member 1104 of suspension member 1100 is positioned laterally outward of pivot line 97. As such, from a top view, pivot line 97 intersects suspension member 1100. Also, at least first coupling member 1102 of suspension member 100 is positioned vertically below pivot line 97 when viewed from the rear.

As disclosed herein (with respect to FIG. 6A), suspension member 1100 is positioned relative to line 116 extending between the forward extent of trailing arm 1040 and ball joint 118 of rear ground-engaging member 14. More particularly, suspension member 1100 may extend generally parallel to line 116 or may be angled relative to line 116. Illustratively, suspension member 1100 extends substantially parallel to line 116. Additionally, suspension member 1100 is positioned laterally inward of line 116.

With this configuration of rear suspension assembly 1026, suspension member 1100 may be provided on vehicle 10 to control toe of rear ground-engaging member 14 without interfering with the movement of other components of rear suspension assembly 1026, such as trailing arm 1040, control arms 1042, 1044 or rear axles 1056.

It is further apparent from FIG. 24 that rear suspension assembly 1026 does not interfere with any portion of powertrain assembly 16 and, instead, generally surrounds at least a portion of powertrain assembly 16. Illustratively, trailing arms 1040 and suspension member 1100, 1100' extend to a position forward of a portion of powertrain assembly 16. For example, suspension member 1100 extends to a position forward of rear final drive member 120, shiftable transmission 122, engine 124, and CVT 126. More particularly, first coupling member 1102 of suspension member 1100 and the forward extent of trailing arm 1040 are positioned entirely forward of CVT 126 and engine 124. Additionally, at least transmission 122, engine 124, and CVT 126 are positioned laterally intermediate suspension members 1100. Illustratively, as shown in FIG. 24, when CVT 126 is oriented longitudinally and positioned laterally outward of engine 124, CVT 126 is still positioned entirely with the lateral and longitudinal extent of suspension members 1100.

The disclosures herein with respect to rear suspension assemblies 26, 26', 1026 disclose operation of the rear suspension components during normal operation of the vehicle. However, if a situation arises where suspension member 100, 1100 or other suspension component breaks or otherwise fails, rear suspension assembly 26, 26', 1026 is configured to prevent rear ground-engaging member 14 from having excessive toe change and potentially interfering with other components of vehicle 10. More particularly, and as shown FIGS. 25 and 26, steering limit features or members are disclosed as 1214 and 1216. Illustratively, a forward surface 1210 of knuckle 1052 includes an angled surface 1216 positioned forward of rear axle 1056. Angled surface 1216 defines a steering limit or stop feature of rear suspension assembly 1026 that would prevent oversteering or excessive toe change of rear ground-engaging member 14 if suspension member 1100 or control arms 1042, 1044 are disconnected or otherwise fail or break. Therefore, angled surface 1216 protrudes rearwardly from knuckle 1052 and is positioned to allow contact with a portion of rear axle 1056, if necessary, to prevent oversteering and/or damage to other components of vehicle 10.

Similarly, a rearward surface 1212 of knuckle 1052 or second coupler 1060 of trailing arm 1040 includes an angled member or surface 1214 which defines a second steering limit or stop feature that also prevents oversteering or excessive toe change of rear ground-engaging member 14 if suspension member 1100 or control arms 1042, 1044 are disconnected or fail. In one embodiment, angled surface 1214 may be integrally formed with knuckle 1052 or second coupler 1060 or may be separate therefrom. Angled surface 1214 protrudes forwardly from rearward surface 1212 and is positioned to allow contact with rear knuckle 1052, if necessary, to prevent oversteering and/or damage to other components of vehicle 10.

The inclusion of angled surfaces 1214, 1216 as stop or travel limits of rear suspension assembly 1026 prevents undesired rear steering change in the event of a disconnection or failure of a rear steering or suspension components. Surfaces 1214, 1216 are configured to be engaged outside of normal operational steering limits in that, during normal operation, surfaces 1214, 1216 are not engaged; however, if a suspension or steering component fails and, therefore, rear suspension assembly 26, 26', 1026 may operate outside of normal conditions, then as rear knuckle 1052 moves outside of the normal travel range, a portion of rear knuckle 1052 contacts one of surfaces 1214, 1216 to prevent rear ground-engaging member 14 from oversteering or excessive toe change. If vehicle 10 did not include surfaces 1214, 1216, then only the spherical joints would limit the travel of rear ground-engaging member 14 in the event of a failure of suspension members 1100, 1042, 1044 but the spherical joints would still allow for some overtravel of rear ground-engaging member 14 and excessive load.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
   a frame assembly extending longitudinally along a centerline of the vehicle;
   at least one front ground-engaging member supporting the frame assembly;
   at least one rear ground-engaging member supporting the frame assembly and including a knuckle;
   a rear axle operably coupled to the rear ground-engaging member; and
   a rear suspension assembly operably coupled to the frame assembly and the at least one rear ground-engaging member, the rear suspension assembly comprising:
      a trailing arm generally extending longitudinally and operably coupled to the frame assembly and the at least one rear ground-engaging member;
      an upper radius rod extending in a generally lateral direction relative to the centerline of the vehicle and operably coupled to the trailing arm;
      a lower radius rod extending in the generally lateral direction relative to the centerline of the vehicle and operably coupled to the trailing arm; and
      at least one steering limit configured to limit travel of the rear ground-engaging member, the at least one steering limit including a contact surface facing the rear axle.

2. The utility vehicle of claim 1, wherein the knuckle defines the at least one steering limit.

3. The utility vehicle of claim 2, wherein the at least one steering limit is positioned forward of the rear axle.

4. The utility vehicle of claim 1, wherein the trailing arm defines the at least one steering limit.

5. The utility vehicle of claim 1, wherein the at least one steering limit is defined by a first steering limit positioned forward of the rear axle and a second steering limit positioned rearward of the rear axle.

6. The utility vehicle of claim 1, further comprising a suspension member configured to control toe of the at least one rear ground-engaging member and generally extending longitudinally and operably coupled to the at least one rear ground-engaging member.

7. A utility vehicle, comprising:
a frame assembly extending longitudinally along a centerline of the vehicle;
at least one front ground-engaging member supporting the frame assembly;
at least one rear ground-engaging member supporting the frame assembly and including a knuckle;
a rear axle operably coupled to the rear ground-engaging member;
a rear suspension assembly operably coupled to the frame assembly and the at least one rear ground-engaging member, the rear suspension assembly comprising:
a trailing arm generally extending longitudinally and operably coupled to the frame assembly and the at least one rear ground-engaging member; and
at least one steering limit extending from the knuckle; and
a radius rod extending in a generally lateral direction relative to the centerline of the vehicle and operably coupled to the trailing arm, wherein the steering limit is positioned to contact a portion of the rear axle if the radius rod decouples from the trailing arm.

8. The utility vehicle of claim 7, wherein the steering limit is an angled surface.

9. The utility vehicle of claim 7, wherein the steering limit is positioned forward of the rear axle.

10. The utility vehicle of claim 7, wherein the steering limit is positioned rearward of the rear axle.

11. The utility vehicle of claim 7, wherein the steering limit is integrally formed with the knuckle.

12. The utility vehicle of claim 7, wherein the steering limit is coupled to the knuckle.

13. A utility vehicle, comprising:
a frame assembly extending longitudinally along a centerline of the vehicle;
at least one front ground-engaging member supporting the frame assembly;
at least one rear ground-engaging member supporting the frame assembly;
a rear axle operably coupled to the rear ground-engaging member; and
a rear suspension assembly operably coupled to the frame assembly and the at least one rear ground-engaging member, the rear suspension assembly comprising:
a trailing arm generally extending longitudinally and operably coupled to the frame assembly and the at least one rear ground-engaging member and including a coupler; and
a first steering limit extending from the coupler of the trailing arm and positioned rearward of the rear axle; and
a second steering limit extending from the trailing arm and positioned forward of the rear axle.

14. The utility vehicle of claim 13, wherein the at least one of the first and second steering limits is an angled surface.

15. The utility vehicle of claim 13, further comprising a radius rod extending in a generally lateral direction relative to the centerline of the vehicle and operably coupled to the trailing arm, wherein at least one of the first and second steering limits are positioned to contact a portion of the rear axle when the radius rod is decoupled from the trailing arm.

16. The utility vehicle of claim 13, wherein at least one of the first and second steering limits are positioned spaced from the at least one rear ground-engaging member in normal operating conditions.

17. The utility vehicle of claim 16, further comprising a knuckle, wherein the first steering limit is operable to contact the knuckle when the knuckle moves outside of the normal operating conditions.

\* \* \* \* \*